(12) United States Patent
Park et al.

(10) Patent No.: US 10,292,107 B2
(45) Date of Patent: May 14, 2019

(54) ELECTRONIC DEVICE AND METHOD FOR PROVIDING ROUTE INFORMATION

(71) Applicant: Samsung Electronics Co., Ltd., Gyeonggi-do (KR)

(72) Inventors: Kyong-Ha Park, Gyeonggi-do (KR); Hyunsu Hong, Gyeonggi-do (KR); Gongbo Moon, Gyeonggi-do (KR); Nakhyun Jeon, Gyeonggi-do (KR)

(73) Assignee: Samsung Entertainment Co., Ltd (KR)

( * ) Notice: Subject to any disclaimer, the term of this patent is extended or adjusted under 35 U.S.C. 154(b) by 0 days.

(21) Appl. No.: 15/430,996

(22) Filed: Feb. 13, 2017

(65) Prior Publication Data
US 2017/0238143 A1    Aug. 17, 2017

(30) Foreign Application Priority Data
Feb. 11, 2016 (KR) .......................... 10-2016-0015658

(51) Int. Cl.
*H04W 52/02* (2009.01)
*H04W 4/029* (2018.01)

(52) U.S. Cl.
CPC ....... *H04W 52/0274* (2013.01); *H04W 4/029* (2018.02); *Y02D 70/1242* (2018.01);
(Continued)

(58) Field of Classification Search
CPC .............. H04W 52/0274; H04W 4/029; Y02D 70/142; Y02D 70/1262; Y02D 70/164; Y02D 70/00
(Continued)

(56) References Cited

U.S. PATENT DOCUMENTS 8,823,585 B2 * 9/2014 Karaoguz ............... G01S 19/48
342/357.31
9,451,580 B2 * 9/2016 Luo .......................... G01S 19/49
(Continued)

FOREIGN PATENT DOCUMENTS

EP     1357361       10/2003
EP     2 009 394     12/2008
(Continued)

OTHER PUBLICATIONS

International Search Report dated Apr. 26, 2017 issued in counterpart application No. PCT/KR2017/001264, 12 pages.
(Continued)

*Primary Examiner* — Marisol Figueroa
(74) *Attorney, Agent, or Firm* — The Farrell Law Firm, P.C.

(57) ABSTRACT

An electronic device is provided and includes a communication module, a sensor module, a memory, and a processor configured for acquiring first movement information regarding a first region of a route on which the electronic device moves by using the communication module, if the first movement information satisfies a first condition for route information of the movement route information, deactivating the communication module, and acquiring second movement information regarding a second region of the route by using the sensor module, and if the first movement information satisfies a second condition for the route information of the movement route information, acquiring the second movement information by using the communication module, and providing current movement route information of the electronic device by using the second movement information.

21 Claims, 20 Drawing Sheets

(52) U.S. Cl.
CPC ........ *Y02D 70/1262* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/26* (2018.01)

(58) Field of Classification Search
USPC .............................................. 455/456.1–457
See application file for complete search history.

(56) References Cited

U.S. PATENT DOCUMENTS

| | | | |
|---|---|---|---|
| 2009/0005018 A1* | 1/2009 | Forstall | H04M 3/42348 455/414.1 |
| 2009/0192709 A1* | 7/2009 | Yonker | G01C 21/20 701/470 |
| 2010/0253503 A1* | 10/2010 | Juang | G01S 19/34 340/539.1 |
| 2011/0128824 A1 | 6/2011 | Downey et al. | |
| 2011/0172909 A1 | 7/2011 | Kahn et al. | |
| 2012/0016624 A1 | 1/2012 | Caritu et al. | |
| 2012/0146848 A1* | 6/2012 | Ezer | G01S 19/34 342/357.25 |
| 2013/0085861 A1* | 4/2013 | Dunlap | G01S 19/34 705/14.58 |
| 2013/0244686 A1* | 9/2013 | Saha | G06F 1/3206 455/456.1 |
| 2013/0304377 A1 | 11/2013 | Van Hende | |
| 2013/0314278 A1 | 11/2013 | Lim et al. | |
| 2014/0031092 A1* | 1/2014 | Hohteri | G06F 1/3231 455/574 |
| 2014/0188381 A1 | 7/2014 | Saitoh | |
| 2014/0194147 A1 | 7/2014 | Kang et al. | |
| 2014/0214316 A1 | 7/2014 | Matsue | |
| 2014/0371887 A1 | 12/2014 | Hoffman et al. | |
| 2015/0081210 A1 | 3/2015 | Yeh et al. | |
| 2015/0163634 A1* | 6/2015 | Meredith | H04W 4/023 455/456.6 |
| 2015/0304985 A1 | 10/2015 | Luo | |
| 2016/0183116 A1* | 6/2016 | Zhang | G01C 21/08 455/456.1 |

FOREIGN PATENT DOCUMENTS

| | | |
|---|---|---|
| EP | 2 299 241 | 3/2011 |
| EP | 2 362 325 | 8/2011 |
| JP | H09243383 | 9/1997 |
| JP | 2006177749 | 7/2006 |
| JP | 2011170856 | 9/2011 |
| JP | 2014048167 | 3/2014 |
| JP | 2014102137 | 6/2014 |
| KR | 20080050987 | 6/2008 |
| KR | 20110072357 | 6/2011 |
| KR | 20130021936 | 3/2013 |
| KR | 20130093948 | 8/2013 |
| KR | 20150032377 | 3/2015 |
| KR | 20150065783 | 6/2015 |

OTHER PUBLICATIONS

European Search Report dated Jan. 25, 2019 issued in counterpart application No. 17750414.9-1219, 7 pages.

* cited by examiner

ELECTRONIC DEVICE AND METHOD FOR PROVIDING ROUTE INFORMATION

PRIORITY

This application claims priority under 35 U.S.C. § 119(a) to Korean Patent Application Serial No. 10-2016-0015658, which was filed in the Korean Intellectual Property Office on Feb. 11, 2016, the entire disclosure of which is incorporated herein by reference.

BACKGROUND

1. Field of the Disclosure

The present disclosure relates generally to an apparatus and method, and more particularly, to an electronic device and a method for providing route information related to a movement of the electronic device.

2. Description of the Related Art

Conventional mobile terminals, e.g., a smart phone, typically use a global navigation satellite system (GNSS) function, e.g., a global positioning system (GPS) function, to provide a location-based service. For example, the mobile terminal may be used to confirm a location of the mobile terminal and may display registered places within a specific range on a basis of a current location of a user, or upon searching for a destination to which the user intends to visit from the current location, may display information related to a movement route, or may display a distance between the current location and the found destination. However, if the mobile device continuously uses the GPS function, electric current consumption may be significantly increased.

SUMMARY

An aspect of the present disclosure provides an apparatus and method for providing a location-based service of a user while minimizing electric current consumption in an electronic device.

In accordance with an aspect of the present disclosure, there is provided an electronic device. The electronic device includes a communication module for receiving geographical location information, a sensor module, a memory for storing movement route information of the electronic device, and a processor configured for acquiring first movement information regarding a first region of a route on which the electronic device moves by using the communication module, if the first movement information satisfies a first condition for route information of the movement route information, deactivating the communication module, and acquiring second movement information regarding a second region of the route by using the sensor module, if the first movement information satisfies a second condition for the route information of the movement route information, acquiring the second movement information by using the communication module, and providing current movement route information of the electronic device by using the second movement information.

In accordance with an aspect of the present disclosure, there is provided a method for providing a movement route of an electronic device. The method includes acquiring first movement information regarding a first region of a route on which the electronic device moves by using a communication module of the electronic device, confirming whether the first movement information satisfies a first condition or a second condition by comparing the first information with the route information of pre-stored movement route information, if the first condition is satisfied, deactivating the communication module, and acquiring second movement information regarding a second region of the route by using a sensor module of the electronic device, if the second condition is satisfied, acquiring the second movement information by using the communication module, and providing current movement route information of the electronic device by using the second movement information.

In accordance with an aspect of the present disclosure, there is provided a non-transitory computer readable recording medium having stored thereon executable instructions, which when executed perform a method for providing a movement route of an electronic device including acquiring first movement information regarding a first region of a route on which the electronic device moves by using a communication module of the electronic device, confirming whether the first movement information satisfies a first condition or a second condition by comparing the first movement information with the route information of pre-stored movement route information, if the first condition is satisfied, deactivating the communication module, and acquiring second movement information regarding a second region of the route by using a sensor module of the electronic device, if the second condition is satisfied, acquiring the second movement information by using the communication module, and providing current movement route information of the electronic device by using the second movement information.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
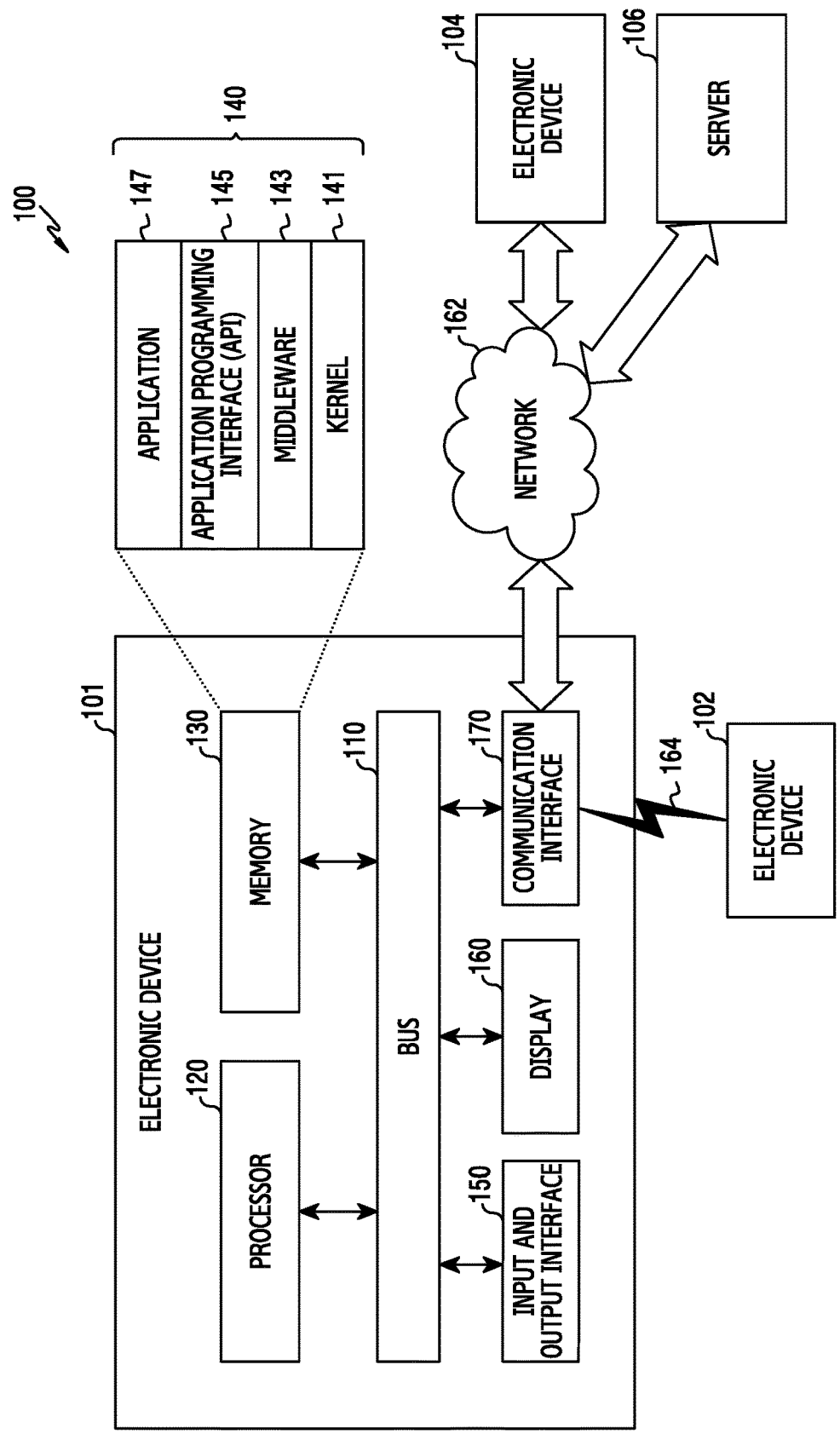
FIG. 1 is a diagram of an electronic device in a network environment, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even terms defined in this disclosure should not be interpreted as excluding the embodiments of the present disclosure.

Electronic devices according to the embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Hereinafter, the electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

Referring to FIG. 1, an electronic device 101 in a network environment 100 is disclosed, according to an embodiment of the present disclosure. The electronic device 101 includes a bus 110, a processor 120, a memory 130, an input/output interface 150, a display 160, and a communication interface 170. The electronic device 101 may omit at least one of the aforementioned constitutional elements or may additionally include other constitutional elements.

The bus 110 may include a circuit for connecting the aforementioned elements 120 to 170 to each other and for delivering communication (e.g., a control message and/or data) between the aforementioned constitutional elements.

The processor 120 may include one or more of a central processing unit (CPU), an application processor (AP), and a communication processor (CP). The processor 120 may control, for example, at least one of the elements of the electronic device 101 and/or may execute an arithmetic operation or data processing for communication.

The memory 130 may include a volatile and/or nonvolatile memory. The memory 130 may store, for example, an instruction or data related to at least one different constitutional element of the electronic device 101. The memory 130 may store a software and/or a program 140. The program 140 may include, for example, a kernel 141, a middleware 143, an application programming interface (API) 145, and/or an application program (or an "application") 147, or the like. At least some parts of the kernel 141, middleware 143, or API 145 may be referred to as an operating system (OS).

The kernel 141 may control or manage system resources (e.g., the bus 110, the processor 120, the memory 130, etc.) used to execute an operation or function implemented in other programs (e.g., the middleware 143, the API 145, or the application 147). Further, the kernel 141 may provide an interface capable of controlling or managing the system resources by accessing individual constitutional elements of the electronic device 101 in the middleware 143, the API 145, or the application 147.

The middleware 143 may perform, for example, a mediation role so that the API 145 or the application 147 can communicate with the kernel 141 to exchange data.

Further, the middleware 143 may handle one or more task requests received from the application 147 according to a priority. For example, the middleware 143 may assign a priority of using the system resources (e.g., the bus 110, the processor 120, or the memory 130) of the electronic device 101 to at least one of the application 147. For instance, the middleware 143 may process the one or more task requests according to the priority assigned to the at least one of the application programs, and thus may perform scheduling or load balancing on the one or more task requests.

The API 145 may include at least one interface or function (e.g., instruction for file control, window control, video processing, or character control, as an interface capable of controlling a function provided by the application 147 in the kernel 141 or the middleware 143.

For example, the input/output interface 150 may play a role of an interface for delivering an instruction or data input from a user or a different external device(s) to the different constitutional elements of the electronic device 101. Further, the input/output interface 150 may output an instruction or data received from the different constitutional element(s) of the electronic device 101 to the different external device.

The display 160 may include various types of displays, for example, a liquid crystal display (LCD) display, a light emitting diode (LED) display, an organic light-emitting diode (OLED) display, a microelectromechanical systems (MEMS) display, or an electronic paper display. The display 160 may display a variety of contents (e.g., text, image, video, icon, symbol, etc.) to the user. The display 160 may include a touch screen. For example, the display 160 may receive a touch, gesture, proximity, or hovering input by using a stylus pen or some parts of a user's body.

The communication interface 170 may establish communication between the electronic device 101 and a first external electronic device 102, a second external electronic device 104, or a server 106. For example, the communication interface 170 may communicate with the second external electronic device 104 or the server 106 by being connected with a network 162 through wireless communication or wired communication.

For example, as a cellular communication protocol, the wireless communication may use at least one of long-term evolution (LTE), LTE advance (LTE-A), code division multiple access (CDMA), wideband CDMA (WCDMA), universal mobile telecommunications system (UMTS), wireless broadband (WiBro), global system for mobile communications (GSM), and the like. Further, the wireless communication may include a near-distance communication 164. The near-distance communication 164 may include at least one of wireless fidelity (WiFi), bluetooth (BT), near field communication (NFC), global navigation satellite system (GNSS), and the like. According to a usage region or a bandwidth or the like, the GNSS may include at least one of global positioning system (GPS), global navigation satellite system (Glonass), Beidou Navigation Satellite System (Beidou), Galileo, the European global satellite-based navigation system, and the like. Hereinafter, the "GPS" and the "GNSS" may be used interchangeably in the present document. The wired communication may include at least one of a universal serial bus (USB), high definition multimedia interface (HDMI), recommended standard-232 (RS-232), power-line communication, plain old telephone service (POTS), and the like. The network 162 may include at least one of a telecommunications network, a computer network (e.g., local area network (LAN) or wide area network (WAN)), the Internet, and a telephone network.

Each of the electronic devices 102 and 104 may be the same type or different type of the electronic device 101. The server 106 may include a group of one or more servers. All or some of operations executed by the electronic device 101 may be executed in a different one of the electronic device 102 or 104 or the server 106. If the electronic device 101 needs to perform a certain function or service either automatically or at a request, the electronic device 101 may request at least some parts of functions related thereto alternatively or additionally to the electronic device 102 or 104 or the server 106 instead of executing the function or the service autonomously. The electronic device 102 or 104 or the server 106 may execute the requested function or additional function, and may deliver a result thereof to the electronic device 101. The electronic device 101 may provide the requested function or service either directly or by additionally processing the received result, e.g., a cloud computing, distributed computing, or client-server computing technique may be used.

Figure 2:
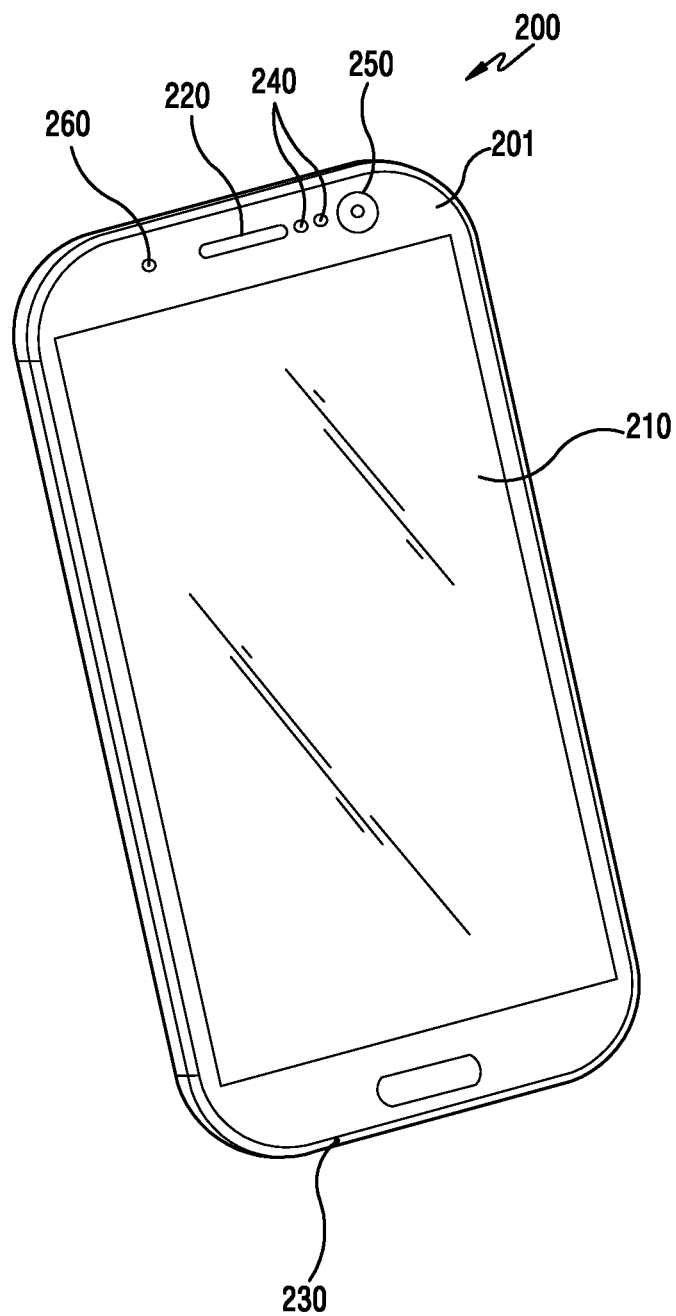
FIG. 2 is a perspective view of an electronic device, according to an embodiment of the present disclosure.

FIG. 2 is a perspective view of an electronic device 200, according to an embodiment of the present disclosure.

Referring to FIG. 2, the electronic device 200 may be implemented with devices for various purposes. For example, although the electronic device 200 may be implemented with a mobile phone, a smart phone, a notebook computer, a tablet device, a wearable device, or the like as described above.

Referring to FIG. 2, a display 210 may be disposed on a front side 201 of the electronic device 200, a speaker 220 for receiving voice of an opposite party may be disposed to an upper side of the display 210, and a microphone 230 for transmitting voice of a user of the electronic device to the opposite part may be disposed to a lower side of the display 210.

Components for performing various functions of the electronic device 200 may be disposed in proximity to a portion to which the speaker 220 is disposed. The components may include at least one sensor module 240. The sensor module 240 may include, for example, at least one of an illumination sensor (e.g., an optical sensor), a proximity sensor, an infrared sensor, and an ultra sonic sensor. The electronic device 200 may include a camera 250, and may include an LED indicator 260 for indicating state information of the electronic device 200 to the user.

The at least one sensor module 240 may further include at least one of a gesture sensor, a magnetic sensor, an inertia sensor, a gyro sensor, an acceleration sensor, and a geomagnetic sensor or the like to detect a motion of the electronic device 200; however, the present disclosure is not limited thereto. The electronic device 200 may use these motion sensing sensors to detect a positional change of the electronic device 200 (or a displacement of the electronic device 200).

Figure 3:
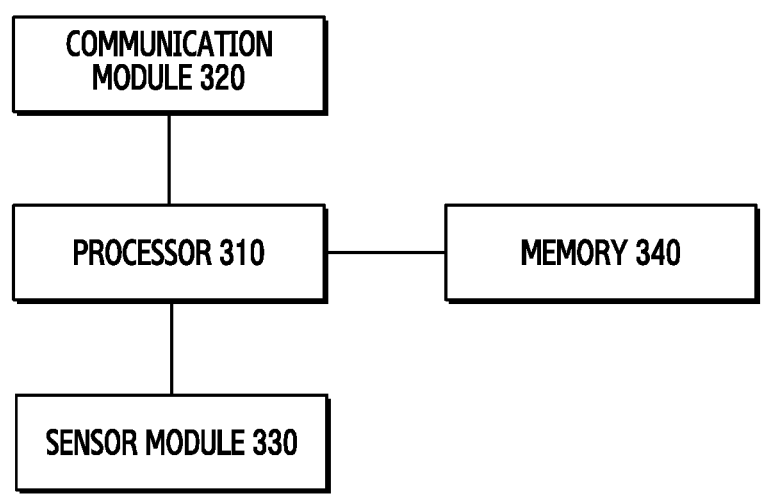
FIG. 3 is a block diagram of an electronic device, according to an embodiment of the present disclosure.

FIG. 3 is a block diagram of the electronic device 200, according to an embodiment of the present disclosure. The electronic device 200 includes a processor 310, a communication module 320, a sensor module 330, and a memory 340. The electronic device 200 may be implemented to have more components or less components than the components of FIG. 3. For example, the electronic device 200 may include an input module (e.g., a touch panel, a physical key, a proximity sensor, a bio sensor, etc.), a power supplier, or the like.

The processor 310 may acquire first movement information regarding a first region of a route on which the electronic device 200 is currently moving by using the communication module 320. For example, the processor 310 may compare the first movement information of the electronic device, received from a GPS satellite, with previous movement route information pre-stored in the memory 340.

For example, the first movement information may include location information of a place to which the electronic device 200 moves (e.g., absolute location information of the electronic device 200 including at least one of latitude information, longitude information, and altitude information). For example, the first movement information may further include at least one of location information regarding the electronic device 200 and received from the GPS satellite, location information regarding the electronic device 200 and acquired by using BT (or BT low energy (BLE)) communication, location information acquired by using Wi-Fi, or the like. The movement route information of the electronic device 200 may further include a movement speed, a time required for a movement, a calorie consumption information, or a combination thereof.

The first movement information for the first region may be information regarding at least some parts of the entire route on which the electronic device 200 moves. If the electronic device 200 repetitively moves on the same movement route several times and thus information regarding the same movement route is received several times, the first movement information may include movement information corresponding to at least one time among the plurality of pieces of movement information. For example, if the electronic device 200 moves on the same movement route repetitively 10 times, information regarding a movement distance regarding a first movement thereof may correspond to the first movement information regarding the first region.

The processor 310 may confirm whether the comparison result satisfies a first condition or a second condition. For example, the first condition may be a case where the first movement information is not matched with at least some parts of a route of the previous movement route pre-stored in the memory 340. The second condition may be a case where the first movement information is matched with the previous movement information pre-stored in the memory 340.

If the first condition is satisfied, the processor 310 may acquire second movement information regarding a second region of the route on which the electronic device 200 is currently moving by using the communication module 320. If the second condition is satisfied, the processor 310 may deactivate the communication module 320, and may acquire the second movement information regarding the second region of the route on which the electronic device 200 is currently moving by using at least one sensor module 330. If the second movement information is acquired by using, for example, the sensor module 330, it may include relative displacement information (e.g., a movement distance, a movement direction, a movement time, an azimuth, a speed, an altitude, etc.) of the electronic device 200.

Relative displacement information of the electronic device 200 may include information regarding a location of the electronic device 200, which is acquired with a determined time interval. The processor 310 may calculate the second movement information based on the relative displacement information of the electronic device 200. For example, the processor 310 may calculate the second movement information by adding a displacement of the electronic device 200 during a designated time (or by performing an integration operation on an increment of the displacement of the electronic device 200).

If the second movement information is acquired by using, for example, the communication module 320, it may include location information of a place to which the electronic device 200 moves (e.g., absolute location information regarding the electronic device 200 and including latitude information, longitude information, and altitude information or geographical location information).

The second movement information regarding the second region may include information regarding at least some parts of a route except for the aforementioned first movement information regarding the first region in the entire route on which the electronic device 200 moves. If the electronic device 200 moves on the same movement route repetitively several times, the second movement information may correspond to at least one time among the remaining times except for the aforementioned first movement information regarding the first region. For example, if the electronic device 200 moves on the same movement route repetitively 10 times, at least some parts of information regarding a movement, which is repeated the remaining 9 times except for the first movement corresponding to the aforementioned first movement information regarding the first region, may correspond to the second movement information regarding the second region.

The processor 310 may provide a user with current movement route information of the electronic device 200 by using the acquired second movement information. A method of providing the user with the current movement route information by the processor 310 may vary based on a user's needs. For example, the processor 310 may provide information by using a method of displaying an image on a display of the electronic device 200, or may provide information by using a method of generating a sound by using a speaker of the electronic device 200.

The processor 310 may provide information acquired by using the communication module 320 based on a first method, and may provide information acquired by using the sensor module 330 based on a second method. The first method and the second method may be at least one of the aforementioned methods for displaying the image on the display and generating the sound by using the speaker.

The aforementioned operations of the processor 310 may be performed by a low power processor further included in the electronic device 200. For example, if the processor 310 is deactivated and thus the display is turned off, the low power processor may access the memory 340 to compare a current movement route of the electronic device 20 with a previous movement route, and may confirm whether the aforementioned first condition or second condition is satisfied.

The low power processor may include a dedicated memory. The processor 310 may periodically store the previous movement route of the electronic device 200 in the dedicated memory of the low power processor, and the low power processor may compare the previous movement route stored in the dedicated memory with the current movement route of the electronic device 200 to confirm whether the aforementioned first condition or second condition is satisfied.

The communication module 230 may receive the first movement information regarding at least some parts of a region of the route on which the electronic device 200 is currently moving. The communication module 320 may acquire location information (e.g., latitude information, longitude information, altitude information, etc.) of a place at which the electronic device 200 is located by using a location measurement module. The location measurement module may be a module related to at least one of a GNSS (e.g., GPS), a cellular module, and a Wi-Fi module.

The communication module 320 may stop acquiring the first movement information depending on whether the aforementioned first condition or second condition is satisfied. For example, if the first condition is satisfied, the communication module 320 may receive the second movement information regarding the movement route of the electronic device 200. If the second condition is satisfied, the communication module 320 may be deactivated to stop the operation of receiving the movement information of the electronic device 200.

If the second condition is satisfied, the sensor module 330 may acquire the second movement information regarding the second region of the route on which the electronic device 200 moves. Based on information acquired through at least one sensor, for example, a gyro sensor, an acceleration sensor, a geomagnetic sensor, and an altitude sensor, the sensor module 330 may calculate a relative displacement of the electronic device 200, e.g., a movement distance, a movement direction, a movement time, an azimuth, a speed, an altitude, or the like of the electronic device 200. The sensor module 330 may further include at least one of an inertia sensor, a gesture sensor, and a magnetic sensor or the like, and may calculate a relative displacement of the electronic device 200 by using at least one of these sensors.

The sensor module 330 may be operatively coupled to a sensor for measuring a 3-axis acceleration and a sensor for sensing a 3-asix directivity to acquire at least one of a movement distance, a movement direction, and a movement time. The sensor module 330 may be operatively coupled to the sensor for measuring the 3-axis acceleration, the sensor for sensing the 3-axis directivity, and a sensor for detecting a 3-axis geomagnetic field to acquire at least one of a movement distance, a movement direction, a movement time, an azimuth, and a speed.

When using the geomagnetic sensor, the electronic device 200 may use fingerprint information. The fingerprint information may detect a movement of the electronic device 200 in an indoor environment. For example, the fingerprint information is provided in a database manner similarly to a fingerprint by finely splitting an indoor space into grids and by measuring strength of Wi-Fi signals for the respective grids. The electronic device 200 may compare the measured strength of the Wi-Fi signal with the database to find a location.

The memory 340 may store absolute location information of the route on which the electronic device 200 moves. For example, after the user executes an application for recording the movement route in the electronic device 200, the electronic device 200 may store the movement route received by using the communication module 320 from starting to ending of the movement in the memory 340. For example, the electronic device 200 may store the movement route received by using the communication module 320 from when the electronic device 200 starts to move to when the electronic stops moving in the memory 340 in real-time. The movement route may be plural in number. Movement routes stored in the memory 340 may be compared with the current movement route of the electronic device 200 by means of the processor 310 when a designated condition is satisfied.

Figure 4:
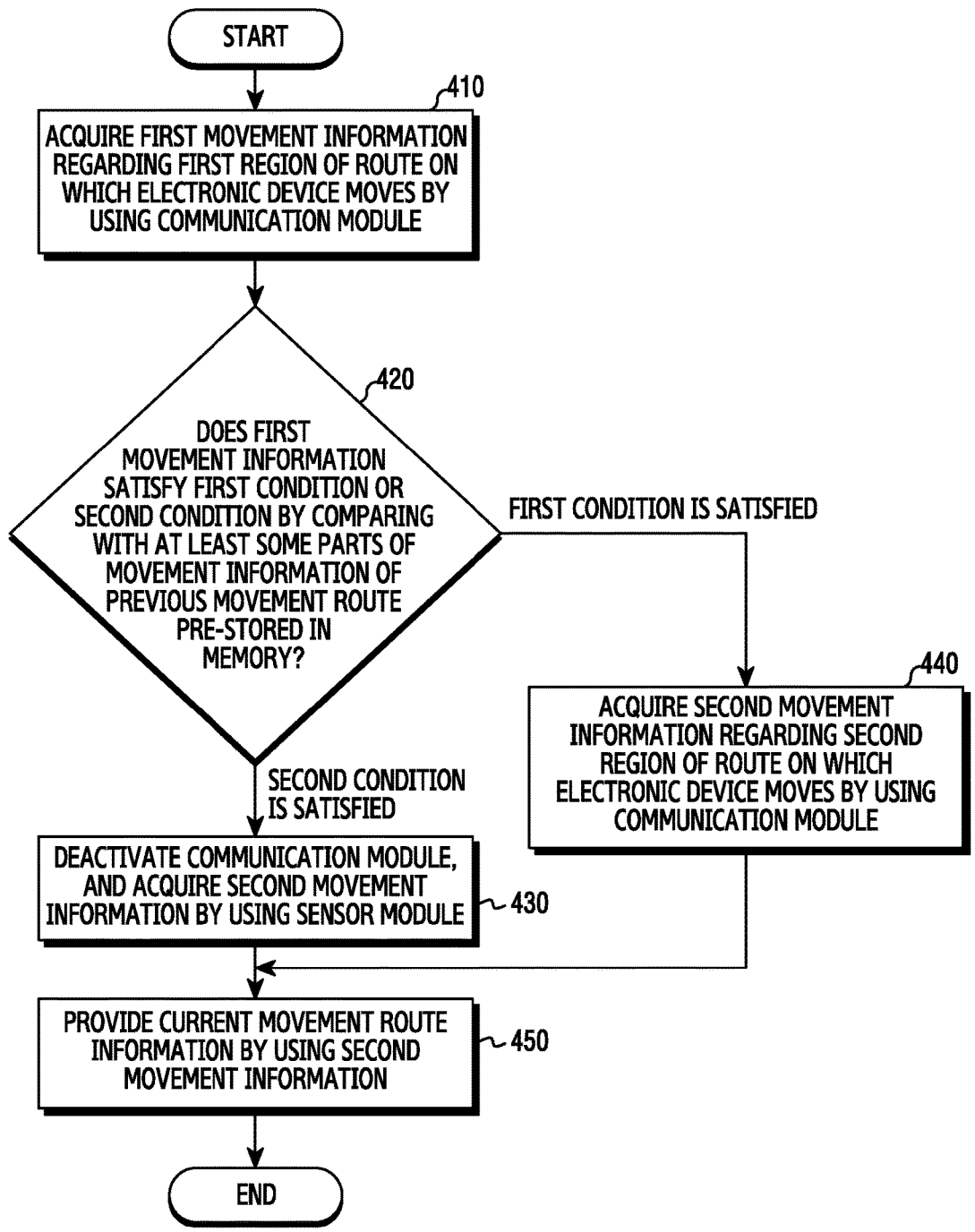
FIG. 4 is a flowchart of a method of generating a movement route, according to an embodiment of the present disclosure.

FIG. 4 is a flowchart of a method of generating a movement route of an electronic device, according to an embodiment of the present disclosure.

Referring to step 410, the electronic device 200 may acquire first movement information regarding a first region of a route on which it moves by using the communication module 320. The first movement information regarding the first region may be information regarding at least some parts of the entire route on which the electronic device 200 moves. If the electronic device 200 moves on the same movement route repetitively several times, the first movement information may be information regarding at least some parts of a route corresponding to at least one time.

At step 420, the electronic device 200 may confirm whether the acquired first movement information satisfies a first condition or a second condition by comparing the first movement information with at least some parts of movement information of a previous movement route pre-stored in the memory 340. For example, the first condition may be a case where the first movement information is not matched with at least some parts of the previous movement route pre-stored in the memory 340. The second condition may be a case where the first movement information is matched with the previous movement route pre-stored in the memory 340.

If the second condition is satisfied, at step 430, the electronic device 200 may deactivate the communication module 320, and may acquire second movement information regarding a second region of a route on which the electronic device 200 moves by using the sensor module 330. The second movement information regarding the second region may be information regarding other parts except for the aforementioned first movement information regarding the first region in the entire route on which the electronic device 200 moves. If the electronic device 200 moves on the same movement route repetitively several times, the information may correspond to at least one time among the remaining times except for the aforementioned first movement information regarding the first region.

If the first condition is satisfied, at step 440, the electronic device 200 may acquire the second movement information regarding the second region of a route on which the electronic device 200 moves by using the communication module 320.

At step 450, the electronic device 200 may provide a user with current movement route information of the electronic device 200 by using the acquired second movement information. For example, the electronic device 200 may provide information by using a method of displaying an image on a display, or may provide information by using a method of generating a sound by using a speaker.

The electronic device 200 may provide information acquired by using the communication module 320 based on a first method, and may provide information acquired by using the sensor module 330 based on a second method. The first method and the second method may be at least one of the aforementioned method of displaying the image on the display and the method of generating the sound by using the speaker.

Figure 5:
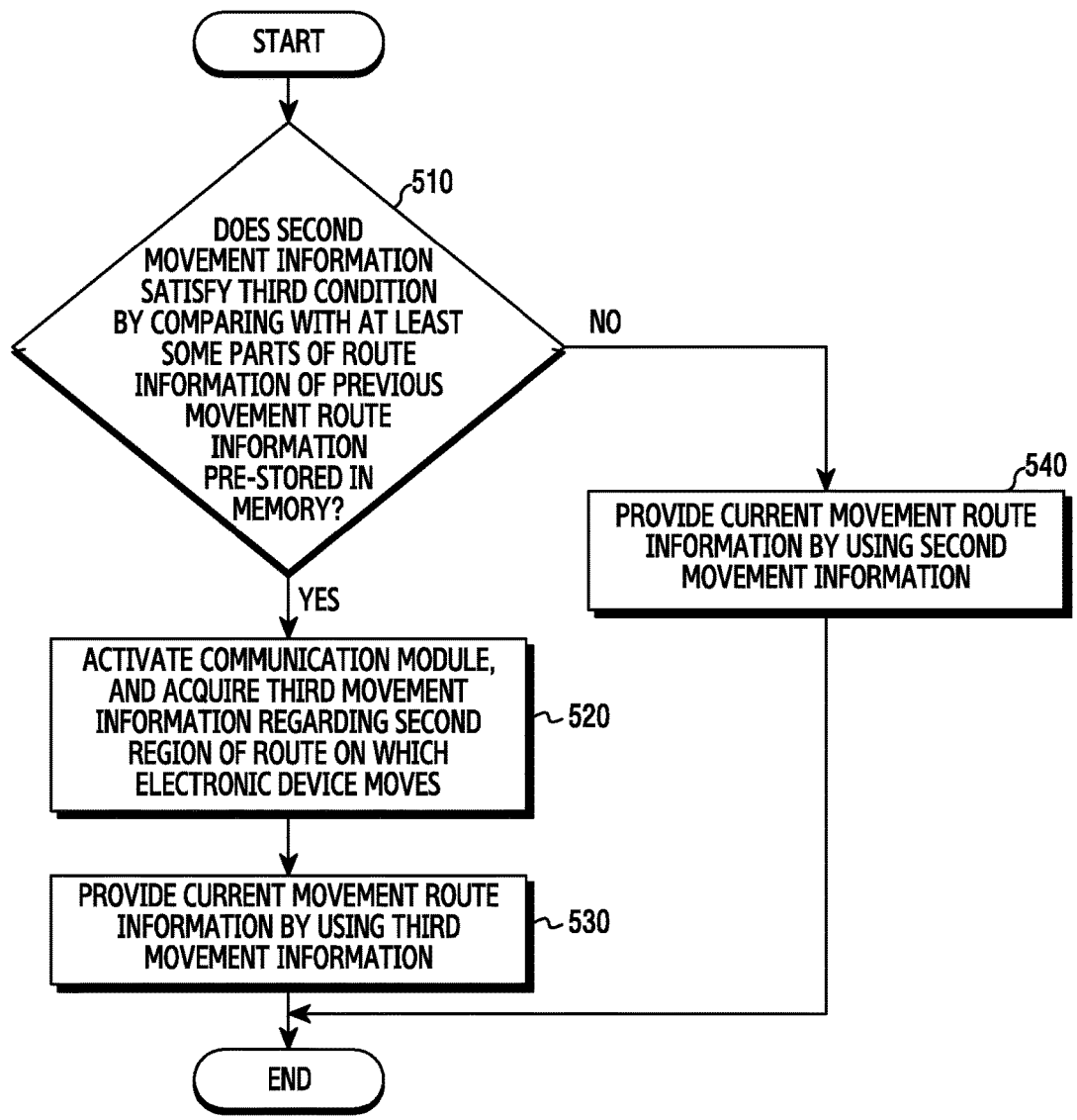
FIG. 5 is a flowchart of a method of generating a movement route, according to an embodiment of the present disclosure.

FIG. 5 is a flowchart of a method of generating a movement route, according to an embodiment of the present disclosure. FIG. 5 may correspond to an operation continued from the operations 430 and 450 of FIG. 4.

At step 510, the electronic device 200 may confirm whether the second movement information regarding the second region of the route on which the electronic device 200 moves satisfies a third condition by comparing the second movement information with at least some parts of route information of the previous movement route information pre-stored in the memory 340. For example, the third condition may be a case where the second movement information is not matched with the at least some parts of route information of the previous movement route pre-stored in the memory 340.

If the third condition is satisfied, at step 520, the electronic device 200 may activate the communication module 320, and may acquire third movement information regarding the second region of the route on which the electronic device 200 moves by using the activated communication module 320. For example, the third movement information may include location information (e.g., latitude information, longitude information, altitude information) of a place at which the electronic device 200 is located. The third movement information regarding the second region may include at least some parts of the second movement information regarding the second region and may be acquired by using the communication module 320 during the second movement information regarding the second region is acquired by using the sensor module 330. That is, regarding the second region to which the electronic device 200 moves, the electronic device 200 may acquire the second movement information and the third movement information.

At step 530, the electronic device 200 may provide the user with information regarding the route on which the electronic device 200 is currently moving by using the acquired third movement information.

If the third condition is not satisfied, at step 540, the electronic device 200 may provide the user with the information regarding the route on which the electronic device 200 is currently moving by using the acquired second movement information. For example, the electronic device 200 may acquire the second movement information regarding the second region by using the sensor module 330, and may provide information regarding the route on which the electronic device 200 is currently moving at least on the basis of the acquired second movement information.

Figure 6:
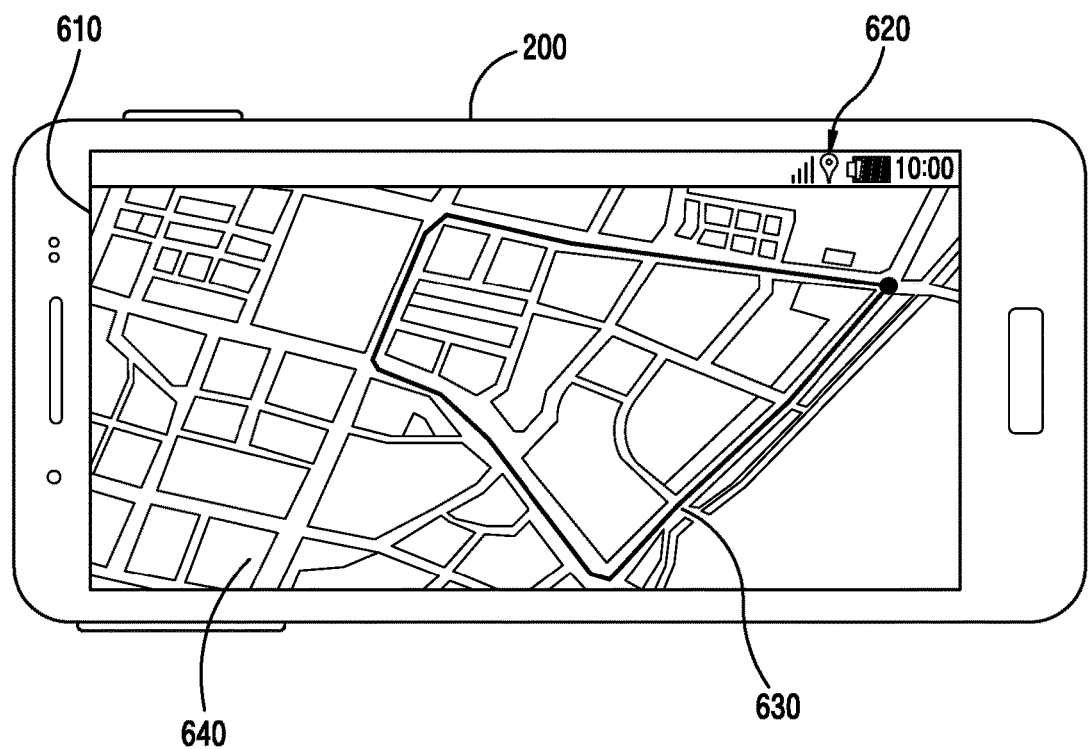
FIG. 6 to FIG. 8 are diagrams of screen configurations of an electronic device, which illustrate generating route information, according to an embodiment of the present disclosure.
Figure 7:
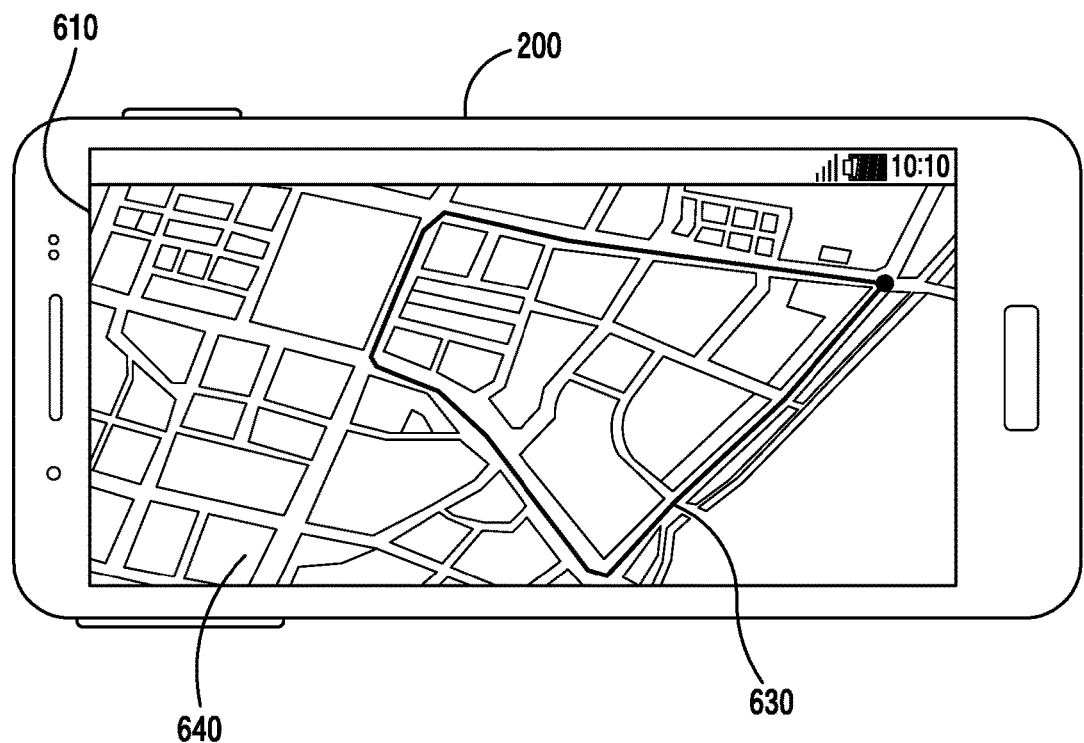
Figure 8:
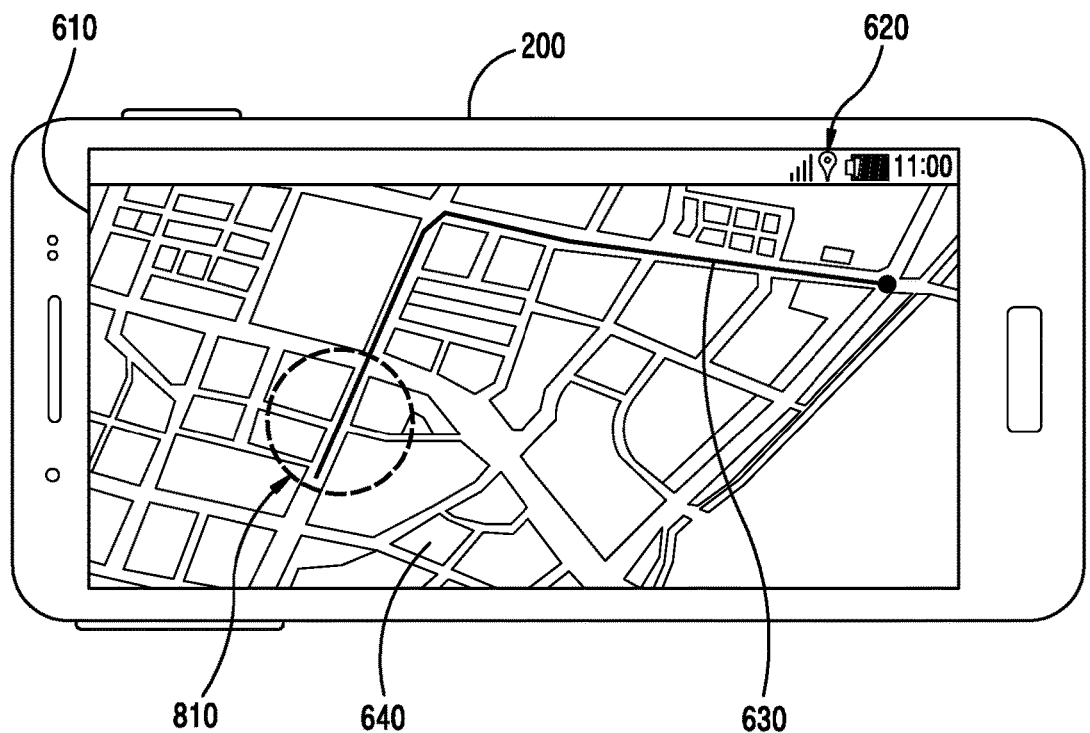

FIG. 6 to FIG. 8 are diagrams of screen configurations of an electronic device, which illustrate generating route information, according to an embodiment of the present disclosure.

Referring to FIG. 6, the electronic device 200 may display a map 640 on a display 610, and may display a movement route 630 of a user by using location information acquired from the communication module 320. If the location information is acquired by using the communication module 320, the electronic device 200 may display an icon 620 on the display 610 to report that the communication module 320 is activated.

If the user executes an application capable of recording the movement route, the movement route 630 may be recorded in the memory 340 of the electronic device 200 and may be displayed on the display 610. The electronic device 200 may always record the movement route, and may start and end the recording of the movement route based on a surrounding situation (or surrounding situation information) measured by the electronic device 200.

For example, the electronic device 200 may recognize that the state corresponds to where the user is exercising, and may start the recording of the movement route. More specifically, when a user's movement speed measured by using the sensor module 330 is greater than or equal to a pre-set speed or if a user's heart rate measured by using a heart rate sensor is greater than or equal to a pre-set number, the electronic device 200 may recognize that it is the state where the user is exercising; however, a sensor capable of recognizing a user's exercise state is not limited to the heart rate sensor. For example, all bio sensors capable of acquiring user's bio information such as a pulse sensor or the like may be included.

The electronic device 200 may start the recording of the movement route of the electronic device 200 by receiving a pre-set signal from another electronic device connected through a network. For example, if the user allows a wearable device and the electronic device 200 to interwork through the network, the user may execute an application for recording a movement route at least on the basis of a pre-set signal received from the wearable device.

The wearable device may measure a user's heart rate, movement, or the like. If a measurement result exceeds a pre-set number, the wearable device may transmit a signal for requesting for starting the recording of the movement route of the electronic device 200.

Referring to FIG. 6, the electronic device 200 may display a movement route 630. The movement route 630 may be displayed together with a map 640 or by overlapping with the map 640. The movement route 630 may be displayed based on the data acquired through the communication module 320.

If it is determined that the same movement route 630 is repeated by more than a pre-set number of times, the electronic device 200 may compare the acquired movement route 630 with movement routes pre-stored in the memory 340 to determine whether the communication module 320 is deactivated.

Referring to FIG. 7, if the movement route 630 is matched with one of the movement routes pre-stored in the memory 340, the electronic device 200 may deactivate the communication module 320. In addition, the electronic device 200 may acquire a movement route on which the electronic device 200 moves by using the sensor module 330. If the communication module 320 is deactivated, the electronic device 200 may not display the icon 620 for indicating that the communication module 320 is activated in the display 610.

For movement information of the electronic device 200 which is input through the sensor module 330, a relative movement of the electronic device 200 may be recorded without an absolute reference point. For example, the relative movement of the electronic device 200 may include a movement of the electronic device 200, which is acquired with a determined time interval. For example, the electronic device 200 may calculate a movement level of the electronic device 200 by adding a variation of a movement of the electronic device 200 during a designated time (or by performing an integration operation on an increment of the movement of the electronic device 200). The electronic device 200 may record the movement of the electronic device 200, which is acquired through the sensor module 330, based on the location information acquired until a time of deactivating the communication module 320. For example, the electronic device 200 may designate the location information of the electronic device 200 at a time of deactivating the communication module 200 as a start point, and may continuously record the movement of the electronic device 200, which is acquired through the sensor module 330, on the basis of the start point.

As such, when the electronic device 200 deactivates the communication module 320 for acquiring absolute location information, and acquires movement route information of the electronic device 200 by using the sensor module 330, electric current consumption can be decreased. For example, when the electronic device 200 acquires a movement route of the electronic device 200 by using the communication module 320 such as a GPS, electric current of 40 mA may be consumed. When the electronic device 200 acquires the movement route of the electronic device 200 by using the sensor module 330, there is an effect in that the electronic device 200 can acquire the movement route of the electronic device 200 only with electric current of 4 mA.

With reference to FIG. 8, the electronic device 200 may acquire the movement route 630 of the electronic device 200 by using the sensor module 330, and may display it on the display 610. The electronic device 200 may move by being deviated by more than a pre-set distance from the movement route 630 on which it moves repetitively. If it is determined that a movement route 810 acquired by using the sensor module 330 is deviated by more than the pre-set distance from the movement route 630 on which it moves repetitively, the electronic device 200 may re-activate the communication module 302.

The electronic device 200 may acquire movement information of the electronic device 200 through the sensor module 330 until an accurate absolute location of the electronic device 200 is acquired. When the communication module 320 acquires an accurate location, the electronic device 200 may acquire the movement information of the electronic device 200 through the communication module 320, and may compare the new movement route 810 with movement routes pre-stored in the memory 340. If the determination result shows that there is no similar movement route, the electronic device 200 may store the current movement route 810 in the memory 340.

The electronic device 200 may update the new movement route in the memory 340. If the new movement route is updated in the memory 340, a possibility of acquiring a movement of the electronic device 200 by using the sensor module 330 instead of the communication module 320 may be increased when the electronic device 200 moves at a later time. As a result, a situation where the electronic device 200 can save power consumption can be increased, as compared to conventional electronic devices.

Figure 9:
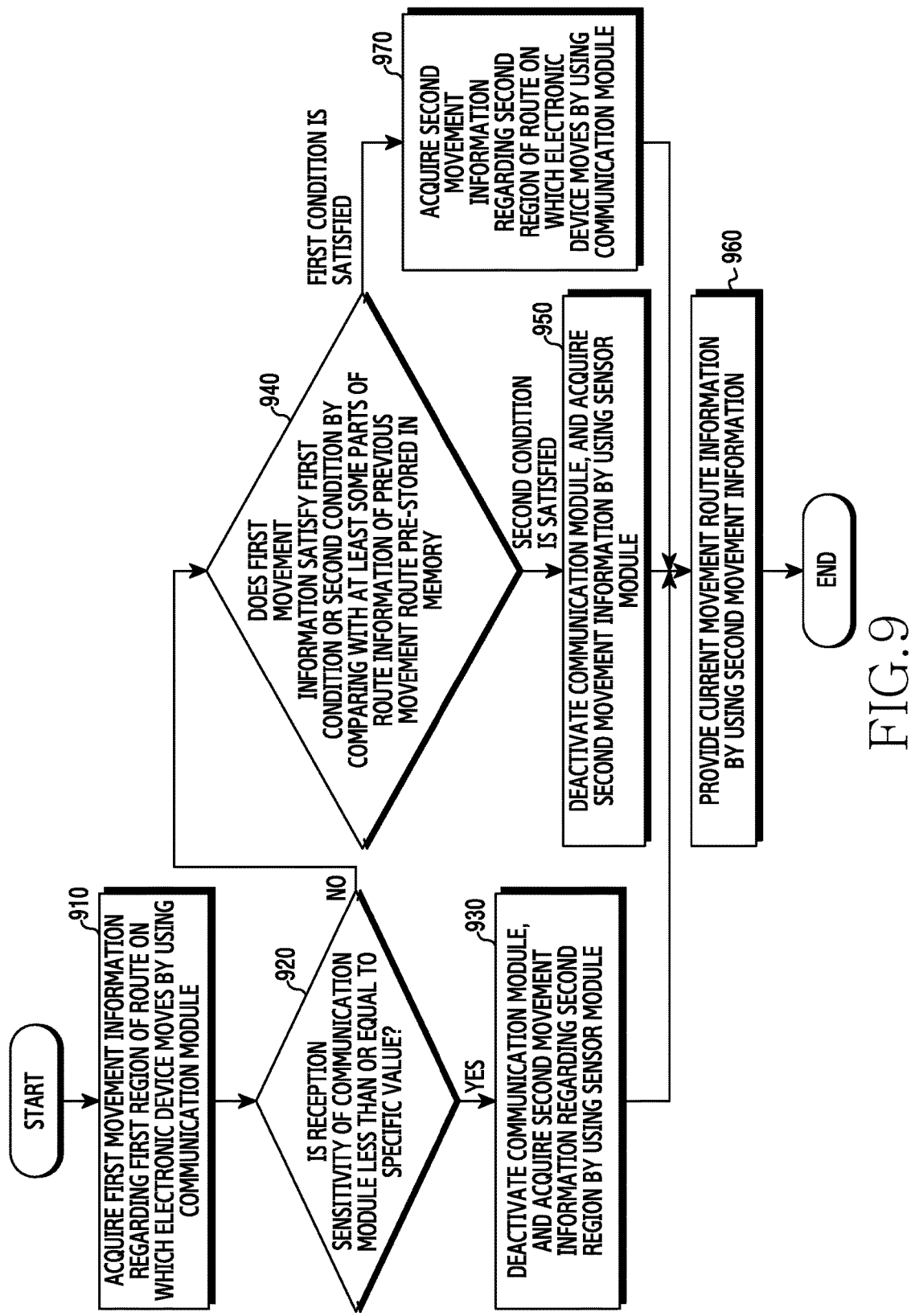
FIG. 9 is a flowchart of a method of generating a movement route, according to an embodiment of the present disclosure.

FIG. 9 is a flowchart of a method of generating a movement route, according to an embodiment of the present disclosure.

At step 910, the electronic device 200 may acquire first movement information regarding a first region of a route on which it moves by using the communication module 320. The first region may be at least some parts of the entire route on which the electronic device 200 moves. If the electronic device 200 moves on the same movement route repetitively several times, the first region may correspond to a movement route corresponding to at least one time.

At step 920, the electronic device 200 may confirm data reception sensitivity of the communication module 320. For example, when the communication module 320 such as a GPS enters an indoor environment, a data signal received from a satellite or the like may be weakened.

If the data reception sensitivity is less than or equal to a specific value, at step 930, the electronic device 200 may deactivate the communication module 320, and may acquire second movement information regarding a second region of a route on which the electronic device 200 moves by using the sensor module 330. The second region may be other parts except for the aforementioned first region in the entire route on which the electronic device 200 moves. If the electronic device 200 moves on the same movement route repetitively several times, the second region may correspond to at least some parts of a movement route corresponding to at least one time among the plurality of times of the same movement route.

The sensor module 330 may be a gyro sensor for sensing a left, right, up, and down operation of the electronic device 200, an acceleration sensor for sensing a speed change, a magnetic sensor for playing a role of an electronic compass, or the like.

At step 960, the electronic device 200 may provide the user with the current movement route information of the electronic device by using the acquired second movement information.

If the data reception sensitivity is greater than or equal to a specific value, at step 940, the electronic device 200 may confirm whether the acquired first movement information satisfies a first condition or a second condition by comparing with at least some parts of movement information of a previous movement route pre-stored in the memory 340.

At step 950, if the second condition is satisfied, the electronic device 200 may deactivate the communication module 320, and may acquire second movement information regarding a second region of a route on which the electronic device 200 moves by using the sensor module 330.

At step 970, if the first condition is satisfied, the electronic device 200 may acquire the second movement information regarding the second region of a route on which the electronic device 200 moves by using the communication module 320.

At step 960, the electronic device 200 may provide a user with current movement route information of the electronic device 200 by using the acquired second movement information.

Figure 10:
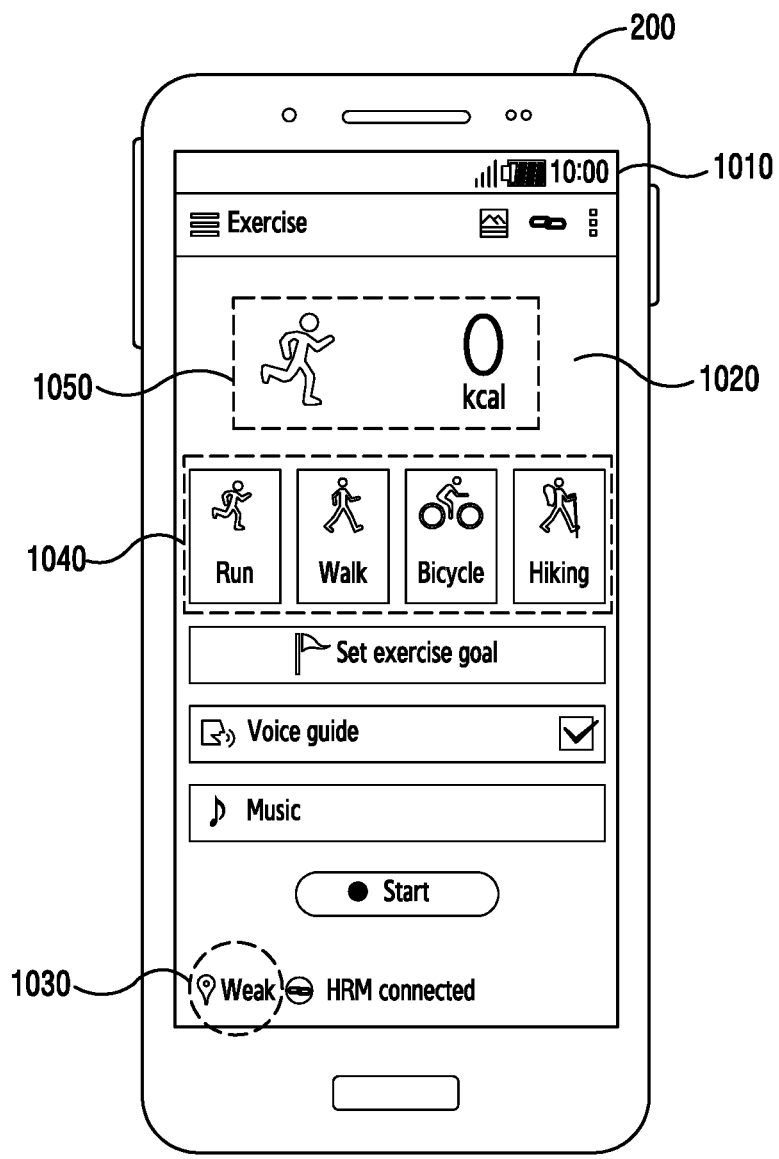
FIG. 10 is a diagram of a screen configuration of an electronic device, which illustrates generating a movement route, according to an embodiment of the present disclosure.

FIG. 10 is a diagram of a screen configuration of an electronic device, which illustrates generating a movement route, according to an embodiment of the present disclosure.

The electronic device 200 may start recording of a movement route of the electronic device 200 by using the methods described with reference to FIG. 3. Referring to FIG. 10, the electronic device 200 may execute an application 1020 for recording the movement route and display it on a display 1010. The application 1020 may select an exercise type 1040, and may display a calorie 1050 consumed after a corresponding exercise is done.

The electronic device 200 may display an icon 1030 indicating that the communication module 320 is activated together with reception sensitivity. The reception sensitivity may be displayed as, for example, strong, moderate, and weak. If the reception sensitivity is weak, as described above with reference to FIG. 9, the electronic device 200 may deactivate the communication module 320, and may acquire the movement route of the electronic device 200 by using the sensor module 330.

The electronic device 200 may automatically switch acquiring the movement route of the electronic device 200 through the communication module 320 and acquiring of the movement route through the sensor module 330 to improve accuracy for the movement route and reduce power consumption.

Figure 11A:
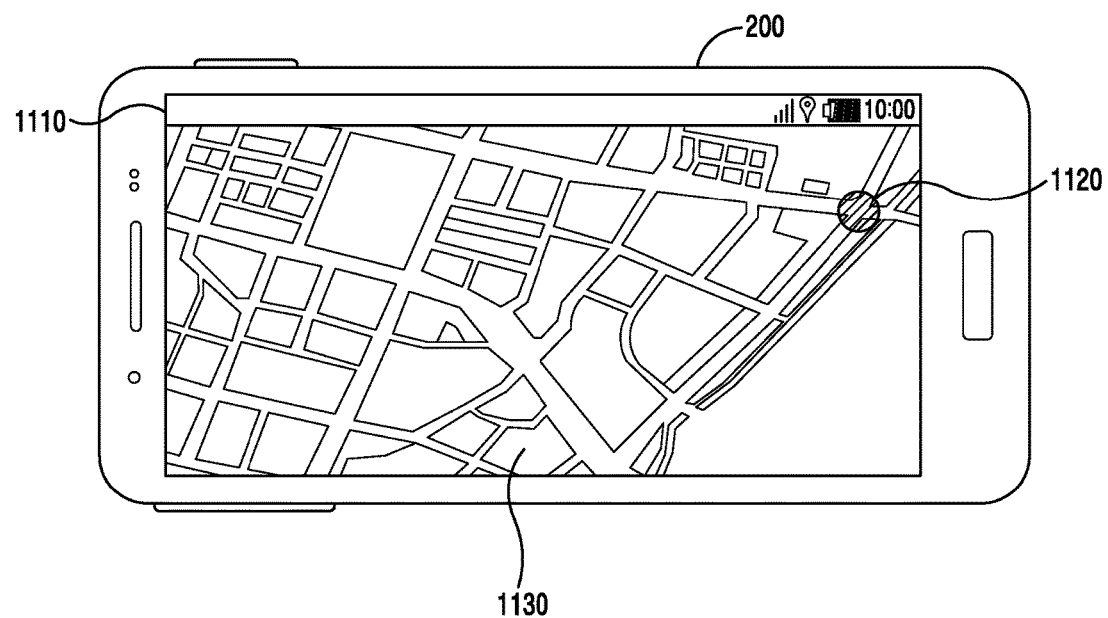
FIG. 11A to FIG. 11C are diagrams of screen configurations of an electronic device, which illustrate designating a start point of a movement route, according to an embodiment of the present disclosure.
Figure 11B:
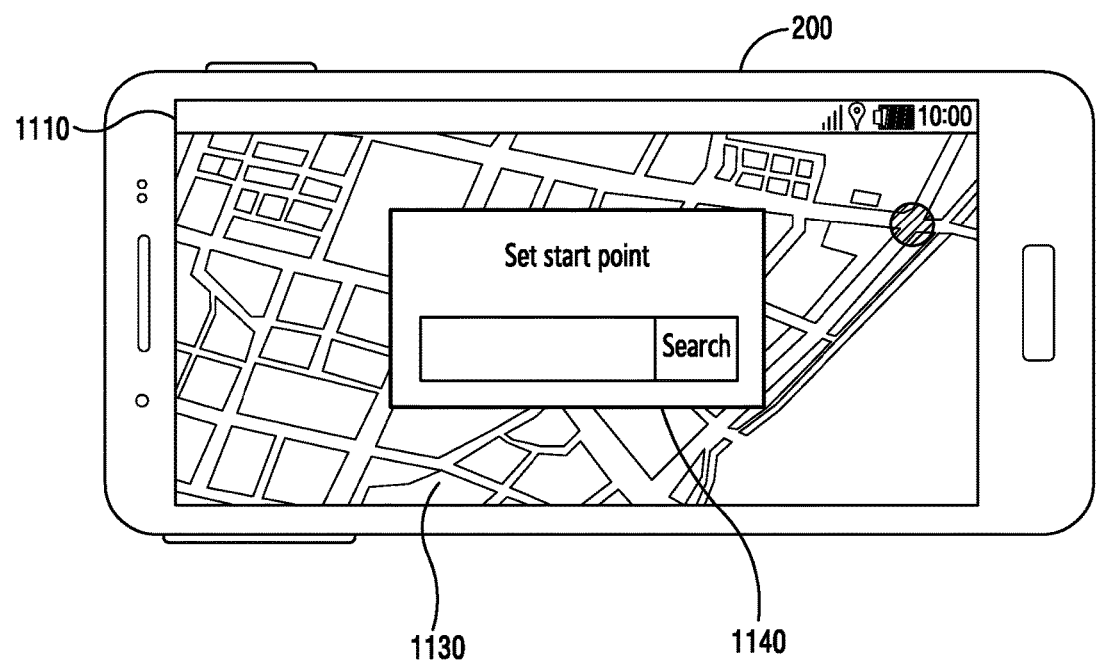
Figure 11C:
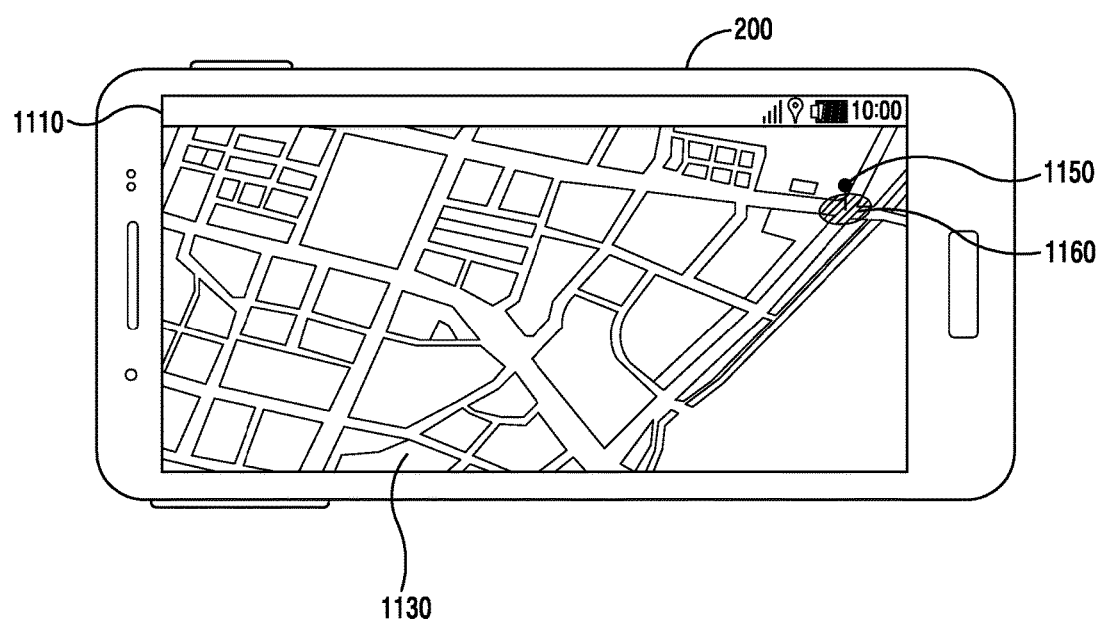

FIG. 11A to FIG. 11C are diagrams of screen configurations of an electronic device, which illustrate designating a start point of a movement route, according to an embodiment of the present disclosure.

Referring to FIG. 11A, the user may touch one place 1120 on a map 1130 displayed on a display 1110 to input a start point of the movement route. For example, referring to FIG. 11B, the electronic device 200 may display an input interface 1140 capable of selecting the start point of the movement route on the display 1110.

The electronic device 200 may configure the start point of the movement route by recognizing a user's voice input through a microphone, or may configure the start point of the movement route by executing an image recognition interface.

The electronic device 200 may configure the start point based on an input from the user according to the aforementioned various methods. For example, the electronic device 200 may configure the start point by discovering a surrounding location of the start point selected by the user.

Referring to FIG. 11C, the electronic device 200 may search for a region 1160 in a specific range from a start point 1150 selected by the user to discover whether there is a location associated with a movement route pre-stored in the memory 340. For example, if there is no movement route including the start point 1150 selected by the user among movement route information stored in the memory 340, the electronic device 200 may search for the region 1160 in the specific range from the start point 1150. If a specific location in the region 1160 existing in a specific range is related to the pre-stored movement route on the basis of a search result, the electronic device 200 may recommend the user the specific location as the start point.

Figure 12A:
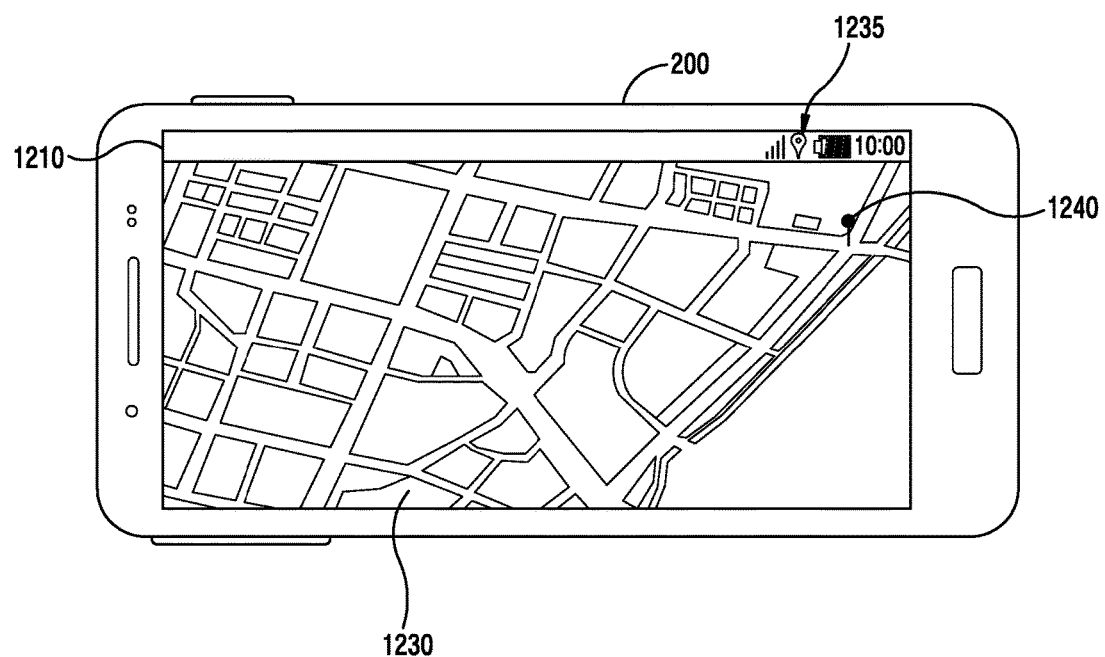
FIG. 12A to FIG. 12C are diagrams of screen configurations of an electronic device, which illustrate searching and providing a movement route candidate, according to an embodiment of the present disclosure.
Figure 12B:
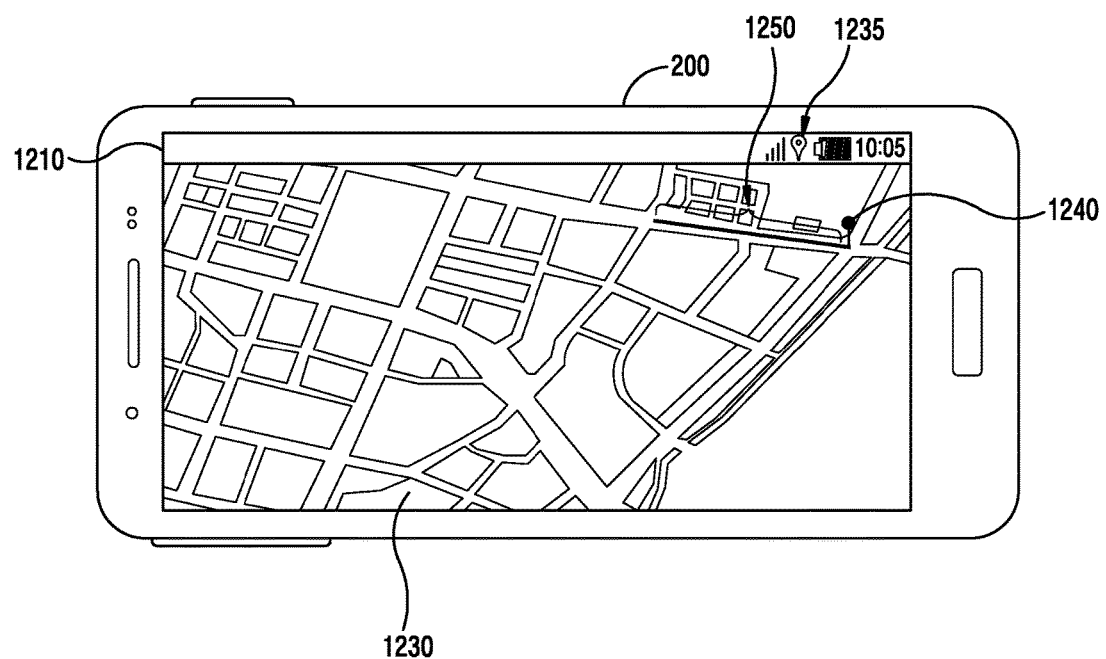
Figure 12C:
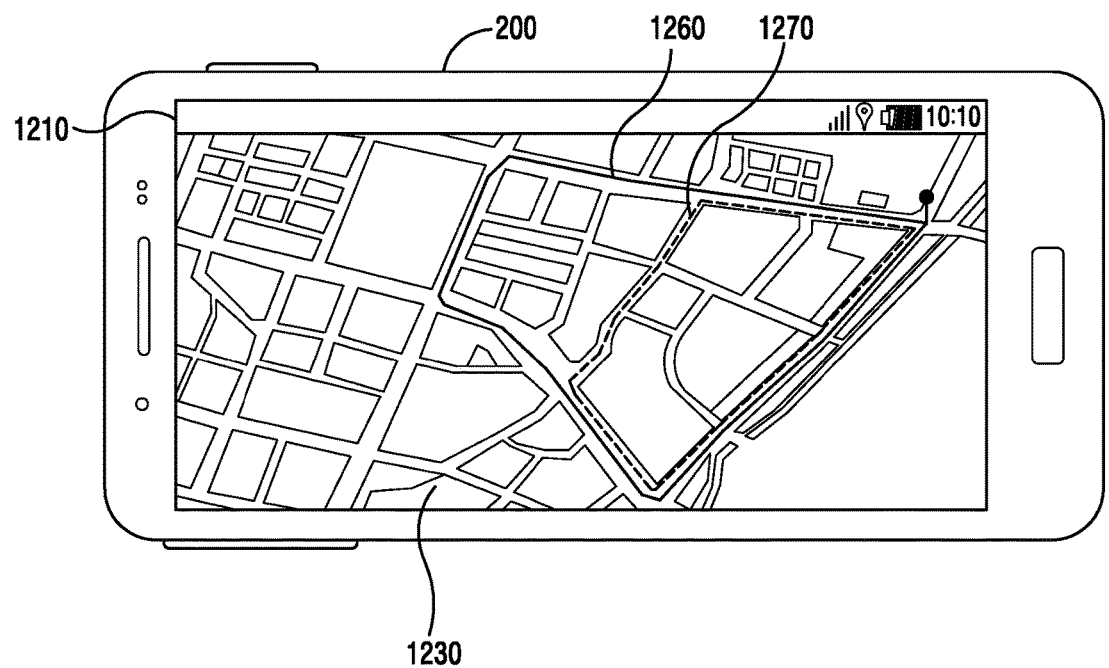

FIG. 12A to FIG. 12C are diagrams of screen configurations of an electronic device, which illustrate searching and providing a movement route candidate, according to an embodiment of the present disclosure.

Referring to FIG. 12A, the electronic device 200 may display a confirmed start point 1240 on a map 1230 displayed on a display 1210. The map 1230 and start point 1240 of FIG. 12A may be in a state of driving an application for recording an exercise route shown in FIG. 10 and for calculating a calorie.

The electronic device 200 may confirm a current location of the electronic device 200 by using the communication module 320, and the electronic device 200 may further display an icon 1235 for reporting that the communication module 320 is activated on the display 1210. The electronic device may confirm whether the current location of the electronic device 200 acquired through the communication module 320 is identical to the confirmed start point 1240. If the two points are identical and the electronic device 200 starts to move, the electronic device 200 may display a movement route on the map 1230.

Referring to FIG. 12B, the electronic device 200 may display a route 1250 on which it is currently moving on the map 1230, and if the route 1250 on which the electronic device 200 is currently moving is greater than or equal to a pre-set distance, the electronic device 200 may compare movement routes pre-stored in the memory 340 with the current movement route 1250.

Referring to FIG. 12C, if a movement route similar to the current movement route 1250 is found among the pre-stored movement routes, the electronic device 200 may display similar movement routes 1260 and 1270 on the map 1230. The electronic device 200 may also trace the current movement route acquired through the communication module 320 to confirm to which movement route it is most similar among the similar movement routes 1260 and 1270.

Referring to FIG. 12C, if it is determined that the same movement route 1260 is repeated more than a pre-set number of times, the electronic device 200 may compare the movement route 1260 acquired through the communication module 320 with movement routes pre-stored in the memory 340 to determine whether the communication module 320 is deactivated.

If the movement route 1260 is matched with one of the movement routes pre-stored in the memory 340, the electronic device 200 may deactivate the communication module 320. In addition, the electronic device 200 may acquire a movement route on which the electronic device 200 moves by using the sensor module 330, and if the communication module 320 is deactivated, the electronic device 200 may not display an icon 1235, which reports that the communication module 320 is activated on the display 1210.

Figure 13:
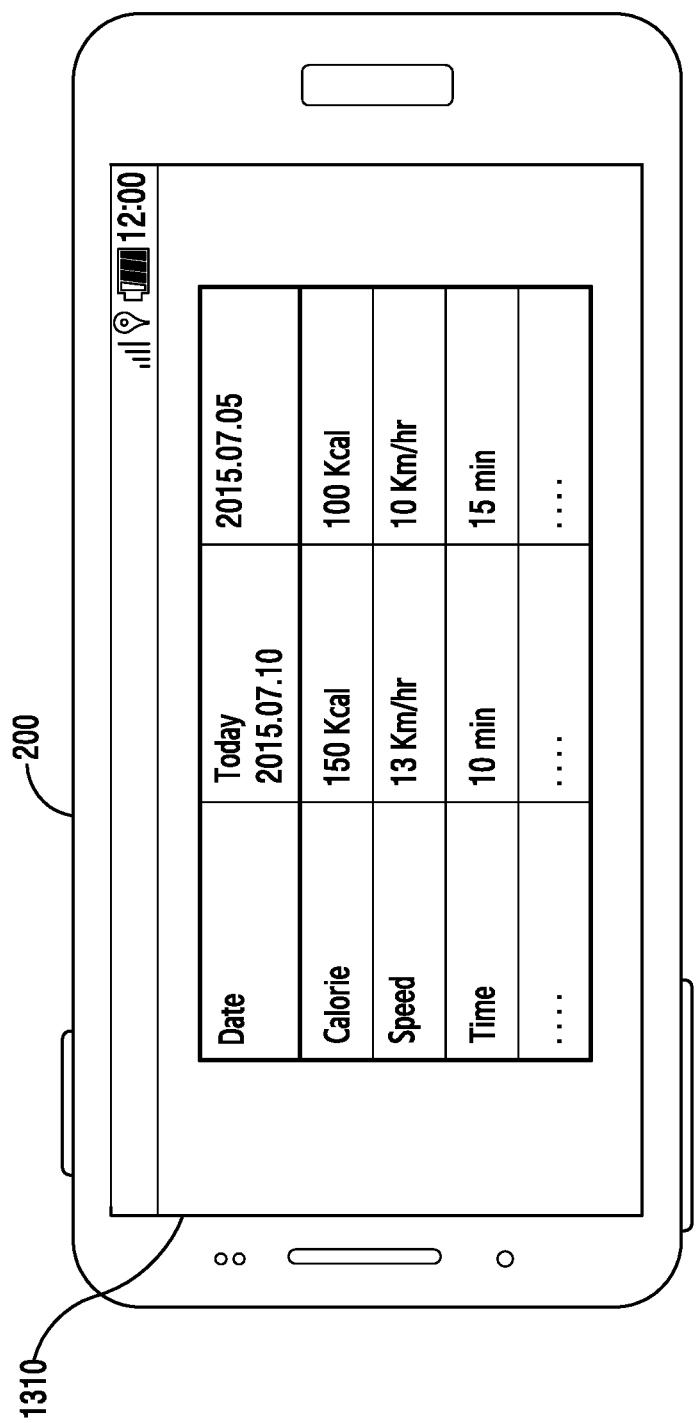
FIG. 13 is a diagram of a screen configuration of an electronic device, which illustrates displaying an exercise result of a user, according to an embodiment of the present disclosure.
Figure 14:
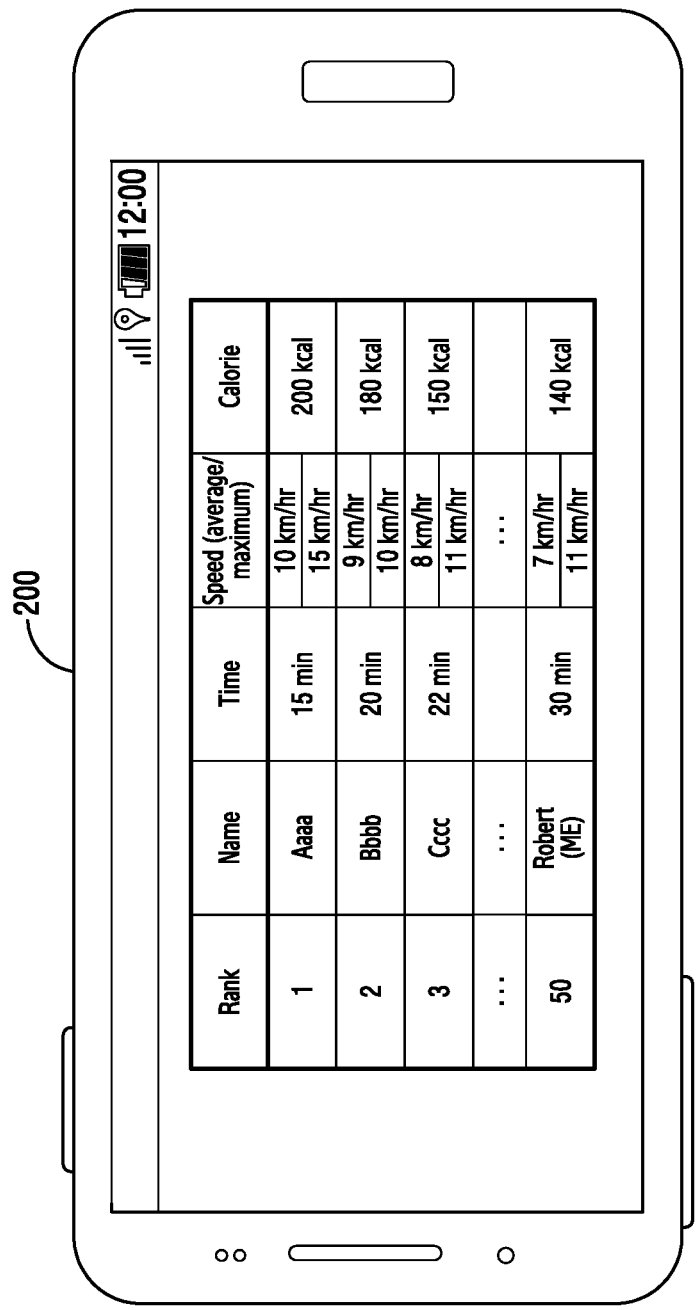
FIG. 14 is a diagram of a screen configuration of an electronic device, which illustrates displaying an exercise result of a user by comparing with other users, according an embodiment of the present disclosure.

When a user ends the aforementioned process of doing exercise along with the movement route, the electronic device 200 may display an exercise outcome. FIG. 13 is a diagram of a screen configuration of an electronic device, which illustrates displaying an exercise result of a user, according to an embodiment of the present disclosure and FIG. 14 is a diagram of a screen configuration of an electronic device, which illustrates displaying an exercise result of a user by comparing with other users, according an embodiment of the present disclosure.

Referring to FIG. 13, the electronic device 200 may display an exercise outcome (e.g., an exercise time, a consumed calorie, an exercise speed, etc.) on a display 1310.

For example, the electronic device 200 a may display an exercise outcome by communicating through a network with an external electronic device (e.g., a tablet PC, a desktop PC).

The electronic device 200 may display the exercise outcome by using a sound through a speaker, and may display the exercise outcome to a user by interworking with a wearable device capable of reproducing the sound.

If a movement route on which an exercise is currently carried out is identical by more than a specific level to the pre-stored movement route, the electronic device 200 may compare an exercise result on the pre-stored movement route with a current exercise result and display a comparison result. Referring to FIG. 13, the current exercise result (e.g., 2015.07.10) and a previous exercise result (2015.07.05) may be displayed simultaneously. Accordingly, the user may confirm a user's exercise outcome and physical improvement result by using a progress of the exercise result.

Referring to FIG. 14, the electronic device 200 may compare an exercise output of a different user and an exercise result of the user and display a comparison result. For example, if the electronic device 200 records a movement route and an exercise output by using a specific application, the application may manage a movement route of each user and an exercise output based on the movement route in a separate server. The electronic device 200 may compare the exercise output of the user with the exercise output of the different user by using exercise output data on the same movement route stored in the server, and may display a comparison result. Accordingly, the user may establish a future exercise plan by comparing the exercise output of the user with the exercise outcome of the different user.

Figure 15:
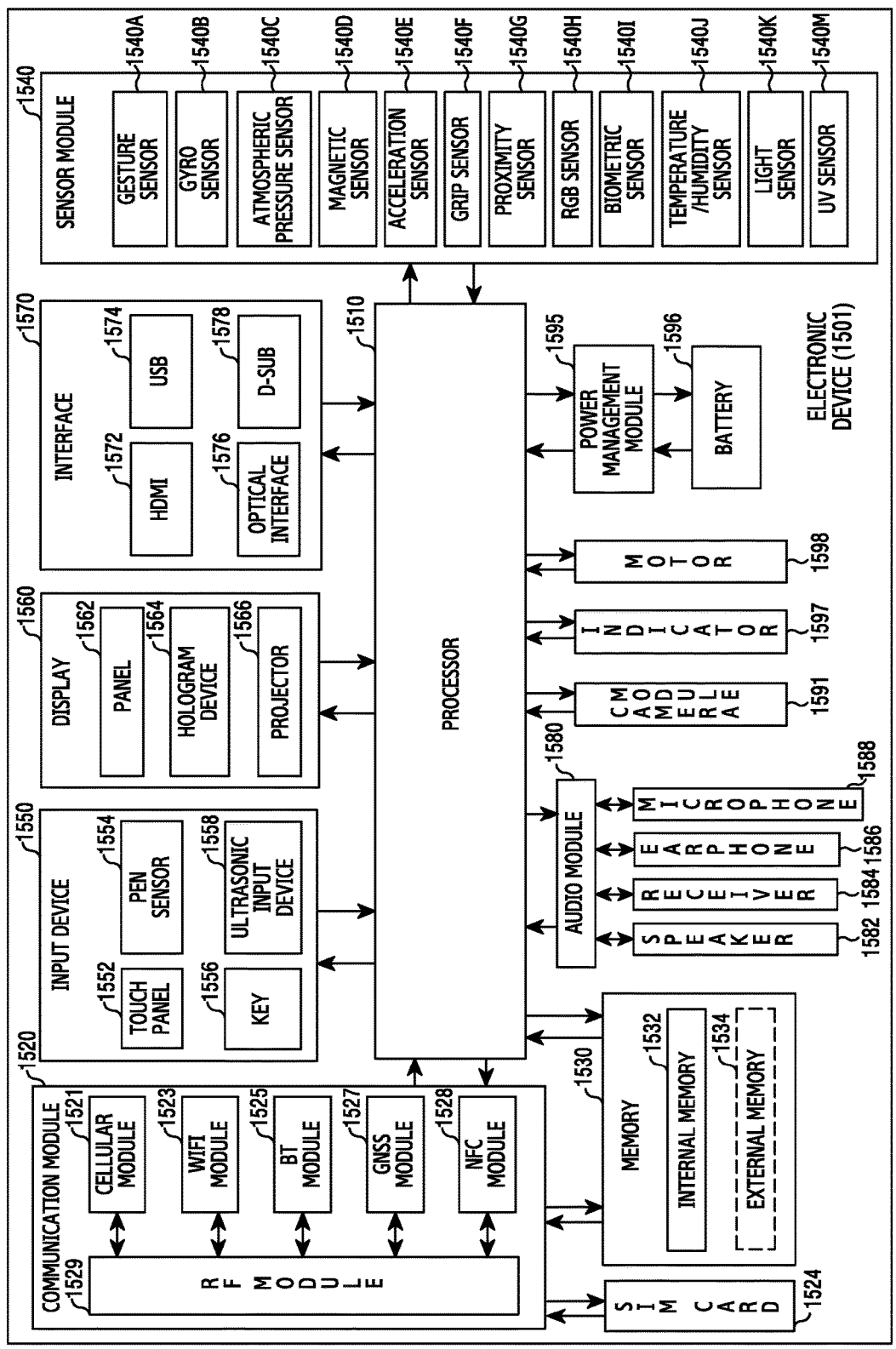
FIG. 15 is a block diagram of an electronic device, according to an embodiment of the present disclosure.

FIG. 15 is a block diagram of an electronic device 1501, according to an embodiment of the present disclosure.

The electronic device 1501 may include all or some parts of the electronic device 101 of FIG. 1. The electronic device 1501 may include one or more processors (e.g., Application Processors (APs)) 1510, a communication module 1520, a Subscriber Identification Module (SIM) 1524, a memory 1530, a sensor module 1540, an input unit 1550, a display 1560, an interface 1570, an audio module 1580, a camera module 1591, a power management module 1595, a battery 1596, an indicator 1597, and a motor 1598.

The processor 1510 may control a plurality of hardware or software constitutional elements connected to the processor 1510 by driving an operating system or an application program, and may process a variety of data including multimedia data and may perform an arithmetic operation. The processor 1510 may be implemented, for example, with a system on chip (SoC). The processor 1510 may further include a graphic processing unit (GPU) and/or an image signal processor. The processor 1510 may include at least some parts (e.g., a cellular module 1521) of the aforementioned constitutional elements of FIG. 15. The processor 1510 may process an instruction or data, which is received from at least one of different constitutional elements (e.g., a non-volatile memory), by loading it to a volatile memory and may store a variety of data in the non-volatile memory.

The communication module 1520 may have the same or similar configuration of the communication interface 170 of FIG. 1. The communication module 1520 may include, for example, the cellular module 1521, a Wi-Fi module 1523, a BT module 1525, a GNSS module 1527 (e.g., a GPS module, a Glonass module, a Beidou module, or a Galileo module, a NFC module 1528, and a radio frequency (RF) module 1529.

The cellular module 1521 may provide a voice call, a video call, a text service, an Internet service, or the like through a communication network. The cellular module 1521 may identify and authenticate the electronic device 1501 in the communication network by using the SIM 1524. The cellular module 1521 may perform at least some functions that can be provided by the processor 1510. The cellular module 1521 may include a CP.

Each of the WiFi module 1523, the BT module 1525, the GNSS module 1527, and the NFC module 1528 may include a processor for processing data transmitted/received through a corresponding module. At least some (e.g., two or more) of the cellular module 1521, the WiFi module 1523, the BT module 1525, the GNSS 1527, and the NFC module 1528 may be included in one integrated chip (IC) or IC package.

The RF module 1529 may transmit/receive a communication signal (e.g., an RF signal). The RF module 1529 may include a transceiver, a power amp module (PAM), a frequency filter, a low noise amplifier (LNA), an antenna, or the like. At least one of the cellular module 1521, the WiFi module 1523, the BT module 1525, the GNSS module 1527, and the NFC module 1528 may transmit/receive an RF signal via a separate RF module.

The SIM 1524 may be an embedded SIM, and may include unique identification information (e.g., an integrated circuit card identifier (ICCID)) or subscriber information (e.g., an international mobile subscriber identity (IMSI)).

The memory 1530 may include an internal memory 1532 or an external memory 1534. The internal memory 1532 may include, for example, at least one of a volatile memory (e.g., a dynamic random access memory (DRAM), a static RAM (SRAM), a synchronous dynamic RAM (SDRAM), etc.) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, etc.), a hard drive, or a solid state drive (SSD)).

The external memory 1534 may further include a flash drive compact flash (CF), secure digital (SD), micro secure digital (Micro-SD), mini secure digital (Mini-SD), extreme Digital (xD), memory stick, or the like. The external memory 1534 may be operatively and/or physically coupled to the electronic device 1501 via various interfaces.

The sensor module 1540 may measure a physical quantity or detect an operational status of the electronic device 1501, and may convert the measured or detected information into an electric signal. The sensor module 1540 may include at least one of a gesture sensor 1540A, a gyro sensor 1540B, a pressure sensor 1540C, a magnetic sensor 1540D, an acceleration sensor 1540E, a grip sensor 1540F, a proximity sensor 1540G, a color sensor 1540H (e.g., a Red, Green, Blue (RGB) sensor), a bio sensor 1540I, a temperature/humidity sensor 1540J, an illumination sensor 1540K, and an ultra violet (UV) sensor 1540M. Additionally or alternatively, the sensor module 1540 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1540 may further include a control circuit for controlling at least one or more sensors included therein. The electronic device 1501 may further include a processor configured to control the sensor module 1504 either separately or as a part of the processor 1510, and may control the sensor module 1540 while the processor 1510 is in a sleep state.

The input device 1550 may include a touch panel 1552, a (digital) pen sensor 1554, a key 1556, or an ultrasonic input unit 1558. The touch panel 1552 may recognize a touch input by using at least one of an electrostatic type, a pressure-sensitive type, and an ultrasonic type. The touch panel 1552 may further include a control circuit. The touch penal 1552 may further include a tactile layer and thus may provide the user with a tactile reaction.

The (digital) pen sensor 1554 may be a part of the touch panel, or may include an additional sheet for recognition. The key 1556 may be, for example, a physical button, an optical key, a keypad, or a touch key. The ultrasonic input unit 1558 may sense an ultrasonic wave generated in an input tool through a microphone 1588 to confirm data corresponding to the sensed ultrasonic wave.

The display 1560 may include a panel 1562, a hologram 1564, or a projector 1566. The panel 1562 may include the same or similar structure of the display 160 of FIG. 1. The panel 1562 may be implemented in a flexible, transparent, or wearable manner. The panel 1562 may be constructed as one module with the touch panel 1552. The panel 1562 may include a pressure sensor (or a force sensor) capable of measuring strength of pressure for a user's touch. The pressure sensor may be implemented by being integrated with the touch panel 1552, or may be implemented as one or more sensors different from the touch panel 1551. The hologram 1564 may use an interference of light and show a stereoscopic image in the air. The projector 1566 may display an image by projecting a light beam onto a screen. The screen may be located inside or outside the electronic device 1501. The display 1560 may further include a control circuit for controlling the panel 1562, the hologram 1564, or the projector 1566.

The interface 1570 may include an HDMI 1572, a USB 1574, an optical communication interface 1576, or a d-sub-miniature (D-sub) 1578. The interface 1570 may be included in the communication interface 170 of FIG. 1. Additionally or alternatively, the interface 1570 may include mobile high-definition link (MHL), SD/MMC, or infrared data association (IrDA).

The audio module 1580 may bilaterally convert a sound and electric signal. At least some constitutional elements of the audio module 1508 may be included in the input/output interface 150 of FIG. 1. The audio module 1580 may convert sound information which is input or output through a speaker 1582, a receiver 1584, an earphone 1586, the microphone 1588, or the like.

The camera module 1591 is a device for image and video capturing, and may include one or more image sensors (e.g., a front sensor or a rear sensor), a lens, an image signal processor (ISP), or a flash (e.g., LED or xenon lamp).

The power management module 1595 may manage power of the electronic device 1501. The power management module 1595 may include a power management integrated circuit (PMIC), a charger integrated circuit (IC), or a battery gauge. The PMIC may have a wired and/or wireless charging type. The wireless charging type may include a magnetic resonance type, a magnetic induction type, an electromagnetic type, or the like, and may further include an additional circuit for wireless charging, for example, a coil loop, a resonant circuit, a rectifier, or the like. The battery gauge may measure residual quantity of the battery 1596 and voltage, current, and temperature during charging. The battery 1596 may include, for example, a rechargeable battery and/or a solar battery.

The indicator 1597 may indicate a specific state a booting state, a message state, a charging state, or the like, of the electronic device 1501 or a part thereof (e.g., the processor 1510). The motor 1598 may convert an electric signal into a mechanical vibration, and may generate a vibration or haptic effect. Although not shown, the electronic device 1501 may include a processing unit (e.g., a GPU) for supporting a mobile TV. The processing unit for supporting the mobile TV may process media data according to a protocol of DMB, Digital Video Broadcasting (DVB), MediaFlo, or the like.

Each of the aforementioned elements described in the present disclosure may consist of one or more components, and names thereof may vary depending on a type of electronic device. The electronic device 1501 may include at least one of the aforementioned elements described herein. Some of the elements may be omitted, or additional other elements may be further included. Further, some of the elements of the electronic device 1501 may be combined and constructed as one entity, so as to equally perform functions of corresponding constitutional elements before combination.

Figure 16:
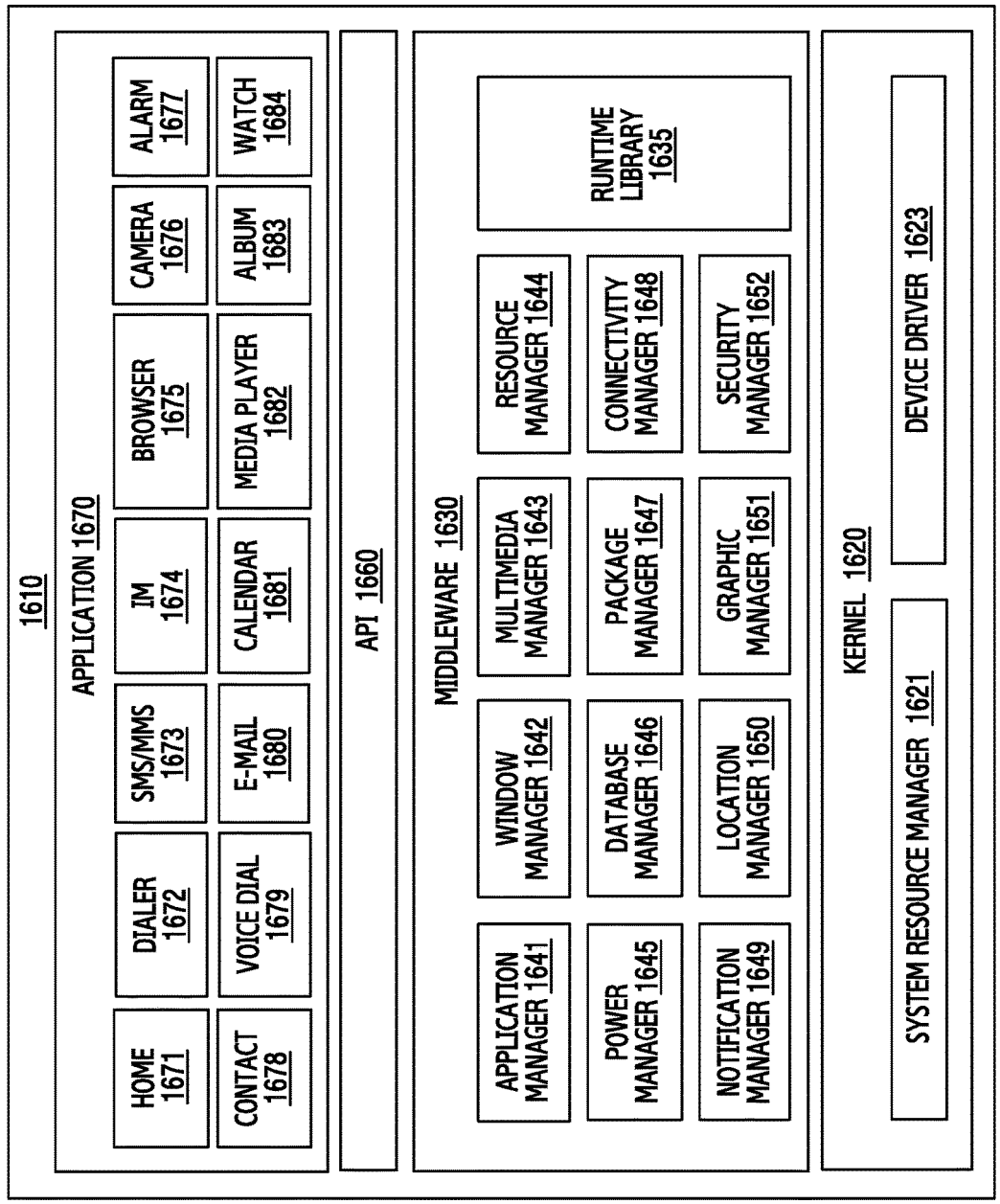
FIG. 16 is a block diagram of a program module, according to an embodiment of the present disclosure.

FIG. 16 is a block diagram of a program module according to an embodiment of the present disclosure. A program module 1610 may include an OS for controlling a resource related to an electronic device (e.g., the electronic device 101 or any of the other electronic devices described herein) or various applications (e.g., the application 147) driven on the OS. The OS may be Android™, iOS™, Windows™, Symbian™, Tizen™, Bada™, or the like.

The programming module 1610 may include a kernel 1620, a middleware 1630, an API 1660, and/or an application 1670. At least some parts of the program module 1610 can be preloaded on the electronic device, or can be downloaded from an external electronic device (e.g., the electronic device 102 or 104, the server 106, or the like).

The kernel 1620 may include a system resource manager 1621 or a device driver 1623. The system resource manager 1621 may perform control, allocation, retrieval, or the like of the system resource. The system resource manager 1621 may include a process managing unit, a memory managing unit, a file system managing unit, or the like. The device driver 1623 may include a display driver, a camera driver, a BT driver, a shared memory driver, a USB driver, a keypad driver, a WiFi driver, an audio driver, or an inter-process communication (IPC) driver.

The middleware 1630 may provide a function commonly required by the application 1670, or may provide various functions through the API 1660 so that the application 1670 can effectively use a limited system resource in the electronic device. The middleware 1630 may include at least one of a runtime library 1635, an application manager 1641, a window manager 1642, a multimedia manager 1643, a resource manager 1644, a power manager 1645, a database manager 1646, a package manager 1647, a connectivity manager 1648, a notification manager 1649, a location manager 1650, a graphic manager 1651, and a security manager 1652.

The runtime library 1635 may include a library module used by a compiler to add a new function through a programming language while the application 1670 is executed. The runtime library 1635 may perform an operation of an input/output management, a memory management, an arithmetic function, or the like.

The application manager 1641 may manage a life cycle of at least one application among the applications 1670. The window manager 1642 may manage a graphic user interface (GUI) resource used in a screen. The multimedia manager 1643 may recognize a format required to reproduce various media files, and may use a codec suitable for the format to perform encoding or decoding of the media file. The resource manager 1644 may manage a resource (e.g., a source code, a memory, a storage space, etc.) of at least any one of the applications 1670.

The power manager 1645 may manage, for example, a battery or power by operating together with a Basic Input/Output System (BIOS), or the like, and may provide power information or the like required for the operation. The database manager 1646 may manage to generate, search, or change a database to be used in at least one application among the applications 1670. The package manager 1647 may manage an installation or update of an application distributed in a form of a package file.

The connectivity manager 1648 may manage a wireless connection such as WiFi, BT, or the like. The notification manager 1649 may display or notify an event such as an incoming message, an appointment, a proximity notification, or the like, in a manner of not disturbing the user. The location manager 1650 may manage location information of the electronic device. The graphic manager 1651 may manage a graphic effect to be provided to the user or a user interface related thereto. The security manager 1652 may provide a general security function required for system security, user authentication, or the like. If the electronic device includes a telephone function, the middleware 1630 may further include a telephony manager for managing a voice or video telephony function of the electronic device.

The middleware 1630 may include a middleware module for forming a combination of various functions of the aforementioned constitutional elements. The middleware 1630 may provide a module specified for each type of operating system to provide a differentiated function. Further, the middleware 1630 may dynamically delete some of the existing constitutional elements or may add new constitutional elements.

The API 1660 is, for example, a set of API programming functions, and may be provided with other configurations according to an operating system. For example, in case of Android™ or IOS™, one API set may be provided for each platform, and in case of Tizen™, two or more API sets may be provided.

The application 1670 may include one or more applications capable of providing a function of, for example, a home application 1671, a dialer application 1672, a short message service (SMS)/multimedia messaging service (MMS) application 1673, an instant message application (IM) 1674, a browser 1675 application, a camera application 1676, an alarm application 1677, a contact application 1678, a voice dial application 1679, an e-mail application 1680, a calendar application 1681, a media player application 1682, an album application 1683, a clock application 1684, a health care application (e.g., an application for measuring a physical activity level, a blood sugar level, etc.), or providing of environment information (e.g., providing of atmospheric pressure, humidity, or temperature information).

The application 1670 may include information exchange application for supporting information exchange between the electronic device 101 and the electronic device 102 or 104. The information exchange application may include a notification relay application for relaying specific information to the external electronic device or a device management application for managing the external electronic device.

For example, the notification relay application may include a function of relaying notification information generated in another application (e.g., an SMS/MMS application, an e-mail application, a health care application, an environment information application, etc.) of the electronic device 101 to the electronic device 102 or 104. Further, the notification relay application may receive notification information from the external electronic device and may provide it to the user.

The device management application may manage (e.g., install, delete, or update), for example, at least one function (e.g., turning on/turning off the external electronic device itself (or some components thereof) or adjusting of a display illumination (or a resolution)) of the electronic device 104 which communicates with the electronic device, an application which operates in the external electronic device, or a service (e.g., a call service or a message service) provided by the external electronic device.

The application 1670 may include an application (e.g., a health management application or the like of a mobile medical device) designated according to an attribute of the electronic device 102 or 104. The application 1670 may include an application received from the server 106 or the electronic device 102 or 104. The application 1670 may include a preloaded application or a third party application that can be downloaded from the server. A name of components of the program module 1610 according to the illustrated embodiments may vary depending on a type of OS.

At least some parts of the program module 1610 may be implemented in software, firmware, hardware, or at least two or more of combinations thereof. At least some parts of the programming module 1610 may be implemented (e.g., executed), for example, by a processor (e.g., the processor 120). At least some parts of the programming module 1610 may include, for example, modules, programs, routines, sets of instructions, processes, or the like for performing one or more functions.

An electronic device as described herein may acquire movement route information by using a sensor module or communication module if a pre-set condition is satisfied during the movement route information is acquired. Therefore, the movement route information can be continuously provided to a user while minimizing power consumption.

At least some parts of a device (e.g., modules or functions thereof) or method (e.g., operations) may be implemented with an instruction stored in a non-transitory computer-readable storage media for example. If the instruction is executed by the processor 120, the processor 120 may perform a function corresponding to the instruction. The non-transitory computer-readable storage media may be, for example, the memory 130.

The non-transitory computer readable recording medium may be a hardware device configured particularly to store and perform a program instruction (e.g., program module), for example, a hard disk, a magnetic medium such as a floppy disc and a magnetic tape, an optical storage medium such as a compact disc-ROM (CD-ROM) or a DVD, a magnetic-optic medium such as a floptical disc, a ROM, a RAM, a flash memory, and the like. An example of the program instruction includes not only a machine language created by a compiler but also a high-level language executable by a computer by using an interpreter or the like. The aforementioned hardware device may be configured to operate as one or more software modules to perform the operation of various embodiments of the present disclosure.

The module or programming module may further include at least one or more elements among the aforementioned elements, or may omit some of them, or may further include additional other elements. Operations performed by a module, programming module, or other elements may be executed in a sequential, parallel, repetitive, or heuristic manner.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
    a communication module for receiving geographical location information;
    a sensor module;
    a memory for storing previous movement route information of the electronic device; and
    a processor configured for:
        acquiring, by using the communication module, first movement information regarding a first region of a route on which the electronic device has moved,
        in response to determining that the first movement information satisfies a first condition for route information of the previous movement route information, deactivating the communication module, and acquiring, by using the sensor module, second movement information regarding a second region of a route on which the electronic device moves,
        in response to determining that the first movement information satisfies a second condition for the route information of the previous movement route information, acquiring the second movement information by using the communication module, and
        providing current movement route information of the electronic device by using the second movement information acquired by the communication module or the sensor module.

2. The electronic device of claim 1, wherein the sensor module comprises a geomagnetic sensor, and wherein the processor is further configured for acquiring the second movement information on the basis of fingerprint information acquired by using the geomagnetic sensor and fingerprint information pre-stored in the memory.

3. The electronic device of claim 1, further comprising an application processor for executing an application and another sensor module, wherein the processor comprises a low power processor for controlling the sensor module and the another sensor module.

4. The electronic device of claim 3, wherein the memory is accessible by the application processor and the low power processor.

5. The electronic device of claim 3, wherein the memory is accessible by the low power processor.

6. The electronic device of claim 1, wherein the processor is further configured for receiving the movement route information from an external electronic device operatively coupled to the electronic device.

7. The electronic device of claim 1, wherein the processor is further configured for:
    determining a movement pattern of the electronic device at least on the basis of the first movement information; and
    comparing the movement pattern with a movement pattern for the route information of the movement route information.

8. The electronic device of claim 1, wherein if the second movement information is acquired by using the sensor module, the processor is further configured for, when the second movement information is matched with the movement route information, providing the route information as current movement route information corresponding to the second movement information.

9. The electronic device of claim 1, wherein the processor is further configured for providing a first attribute for the current movement route information by comparing the first attribute with a second attribute for the movement route information.

10. The electronic device of claim 9, wherein the first attribute comprises one of a first speed, a first required time, a first calorie information, and a combination thereof, and the second attribute comprises a second speed, a second required time, a second calorie information, and a combination thereof.

11. The electronic device of claim 1, wherein the processor is further configured for providing information corresponding to a module used to acquire the second movement information between the communication module and the sensor in association with the second movement information.

12. The electronic device of claim 11, wherein if the module which acquires the second movement information is the communication module, the information is provided by using a first method, and if the module which acquires the second movement information is the sensor, the information is provided by using a second method.

13. The electronic device of claim 1, wherein the processor is further configured for providing the current movement route information through one of a display and an audio module operatively coupled to the processor.

14. The electronic device of claim 13, wherein the processor is further configured for providing the current movement route information as a sound through the audio module.

15. The electronic device of claim 1, wherein acquiring the second movement information regarding the second region of the route by using the sensor module and providing the current movement route information of the electronic device by using the second movement information comprise:
- if the second movement information satisfies a third condition for the route information of the movement route information, deactivating the sensor module, and acquiring, by using the communication module, third movement information regarding a third region of a route on which the electronic device moves; and
- providing current movement route information of the electronic device by using the second movement information.

16. A method for providing a movement route of an electronic device, the method comprising:
- acquiring, by using a communication module of the electronic device, first movement information regarding a first region of a route on which the electronic device has moved;
- identifying whether the first movement information satisfies a first condition or a second condition by comparing the first information with the route information of pre-stored previous movement route information;
- if the first condition is satisfied, deactivating the communication module, and acquiring, by using a sensor module of the electronic device, second movement information regarding a second region of a route on which the electronic device moves;
- if the second condition is satisfied, acquiring the second movement information by using the communication module; and
- providing current movement route information of the electronic device by using the second movement information acquired by the communication module or the sensor module.

17. The method of claim 16, further comprising receiving the pre-stored movement route information from an external electronic device operatively coupled to the electronic device.

18. The method of claim 16, wherein confirming whether the first movement information satisfies the first condition or the second condition by comparing the first information with the route information of the pre-stored movement route information further comprises:
- determining a movement pattern of the electronic device based on the first movement information; and
- comparing the movement route with a movement pattern for the route information of the pre-stored movement route information.

19. The method of claim 16, further comprising:
- if a module which acquires the second movement information is the communication module, providing the information by using a first method, and
- if the module which acquires the second movement information is the sensor module, providing the information by using a second method.

20. A non-transitory computer readable recording medium having stored thereon executable instructions, which when executed perform a method for providing a movement route of an electronic device comprising:
- acquiring, by using a communication module of the electronic device, first movement information regarding a first region of a route on which the electronic device has moved;
- identifying whether the first movement information satisfies a first condition or a second condition by comparing the first movement information with the route information of pre-stored movement route information;
- if the first condition is satisfied, deactivating the communication module, and acquiring, by using a sensor module of the electronic device, second movement information regarding a second region of a route on which the electronic device moves;
- if the second condition is satisfied, acquiring the second movement information by using the communication module; and
- providing current movement route information of the electronic device by using the second movement information.

21. A mobile terminal comprising:
- a communication module;
- a sensor module;
- a memory for storing previous movement route information of the mobile terminal; and
- a processor configured for:
  - acquiring first movement information regarding a first region on which the mobile terminal has moved,
  - if a reception sensitivity of the wireless communication module is less than or equal to a predetermined value, deactivating the communication module and acquiring, using the sensor module, second movement information regarding a second region which the electronic device moves,
  - determining whether the second movement information satisfies a pre-defined condition by comparing the second movement information with at least some parts of route information of the previous movement route information stored in the memory,
  - in response to determining that the second movement information satisfies the pre-defined condition, providing current route information based on the acquired second movement information, and
  - in response to determining that the second movement information does not satisfy the pre-defined condition, activating the communication module, acquiring, using the communication module, third movement information regarding the second region which the electronic device moves, and providing current route information based on the acquired third movement information.

* * * * *

UNITED STATES PATENT AND TRADEMARK OFFICE
CERTIFICATE OF CORRECTION

PATENT NO. : 10,292,107 B2  
APPLICATION NO. : 15/430996  
DATED : May 14, 2019  
INVENTOR(S) : Kyong-Ha Park et al.

Page 1 of 1

It is certified that error appears in the above-identified patent and that said Letters Patent is hereby corrected as shown below:

On the Title Page

(73) Assignee:  
"Samsung Entertainment Co., Ltd (KR)"  
Should be:  
-- Samsung Electronics Co., Ltd (KR) --

Signed and Sealed this  
Twenty-fifth Day of June, 2019

Andrei Iancu  
*Director of the United States Patent and Trademark Office*